US012061955B2

(12) United States Patent
Geraci et al.

(10) Patent No.: US 12,061,955 B2
(45) Date of Patent: Aug. 13, 2024

(54) ELECTRONIC APPARATUS AND SERVER FOR REFINING ARTIFICIAL INTELLIGENCE MODEL, AND METHOD OF REFINING ARTIFICIAL INTELLIGENCE MODEL

(71) Applicant: SAMSUNG ELECTRONICS CO., LTD., Suwon-si (KR)

(72) Inventors: James Russell Geraci, Suwon-si (KR); Bichen Shi, Seoul (KR); Aonghus Lawlor, Seoul (KR); Barry Smyth, Seoul (KR); Neil Hurley, Seoul (KR); Ruihai Dong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 624 days.

(21) Appl. No.: 16/898,890

(22) Filed: Jun. 11, 2020

(65) Prior Publication Data
US 2020/0327451 A1  Oct. 15, 2020

Related U.S. Application Data

(63) Continuation-in-part of application No. 16/846,825, filed on Apr. 13, 2020, now Pat. No. 11,531,912.

(30) Foreign Application Priority Data

| Apr. 12, 2019 | (KR) | ......................... 10-2019-0043309 |
| Sep. 30, 2019 | (KR) | ......................... 10-2019-0120851 |
| Apr. 13, 2020 | (KR) | ......................... 10-2020-0044591 |

(51) Int. Cl.
*G06N 20/00* (2019.01)
*G06F 17/18* (2006.01)
*G06N 5/04* (2023.01)

(52) U.S. Cl.
CPC ............. *G06N 20/00* (2019.01); *G06F 17/18* (2013.01); *G06N 5/04* (2013.01)

(58) Field of Classification Search
CPC ........... G06N 20/00; G06N 5/04; G06F 17/18
See application file for complete search history.

(56) References Cited

U.S. PATENT DOCUMENTS

| 9,483,728 B2 | 11/2016 | Dognin et al. |
| 10,310,022 B2 | 6/2019 | Park et al. |
| (Continued) | | |

FOREIGN PATENT DOCUMENTS

| CN | 108122032 A | 6/2018 |
| JP | 2018-169706 A | 11/2018 |
| (Continued) | | |

OTHER PUBLICATIONS

PCT International Search Report-Written Opinion dated Jul. 31, 2020 for PCT/KR/2020/004965 (10pgs).
(Continued)

*Primary Examiner* — Casey R. Garner
(74) *Attorney, Agent, or Firm* — Nixon & Vanderhye P.C.

(57) ABSTRACT

Provided are an artificial intelligence (AI) system simulating a function of a human brain, such as cognition and judgment, using a machine learning algorithm, such as deep learning, and an application thereof. Also, provided is a method, performed by an electronic apparatus, of refining an artificial intelligence (AI) model, the method including: detecting information about a context of an electronic apparatus used to refine a local model stored in the electronic apparatus being changed; determining a gradient for refining the local model based on the changed information about the context; refining the local model based on the determined gradient; transmitting the gradient to a server; receiving, from the server, information about a global model refined based on
(Continued)

the gradient; and refining the local model based on the received information.

23 Claims, 18 Drawing Sheets

(56) References Cited

U.S. PATENT DOCUMENTS

| | | | |
|---|---|---|---|
| 2015/0007157 A1 | 1/2015 | Park et al. |
| 2015/0007517 A1 | 1/2015 | Park et al. |
| 2015/0135186 A1 | 5/2015 | Lin et al. |
| 2015/0242760 A1 | 8/2015 | Miao et al. |
| 2016/0063393 A1 | 3/2016 | Ramage et al. |
| 2016/0232445 A1 | 8/2016 | Srinivasan et al. |
| 2017/0109322 A1 | 4/2017 | McMahan et al. |
| 2017/0154261 A1 | 6/2017 | Sunehag |
| 2018/0095140 A1 | 4/2018 | Park et al. |
| 2018/0165745 A1 | 6/2018 | Zhu |
| 2018/0283723 A1 | 10/2018 | Ock et al. |
| 2018/0342004 A1 | 11/2018 | Yom-Tov et al. |
| 2019/0279088 A1 | 9/2019 | Zhang et al. |

FOREIGN PATENT DOCUMENTS

| | | |
|---|---|---|
| KR | 10-2015-0002542 A | 1/2015 |
| KR | 10-2017-0009991 A | 1/2017 |
| KR | 10-2018-0037760 A | 4/2018 |
| KR | 10-2018-0112653 A | 10/2018 |
| WO | WO 2018/099084 A1 | 6/2018 |

OTHER PUBLICATIONS

India Office Action dated Jan. 19, 2022 for IN Application No. 202117004671.
Li et al., "A Contextual-Bandit Approach to Personalized News Article Recommendation", WWW 2010, Apr. 26-30, 2010, 10 pages.
Zheng et al. "DRN: A Deep Reinforcement Learning Framework for News Recommendation." Proceedings of the 2018 World Wide Web Conference on World Wide Web, Apr. 23-27, 2018, 10 pages.
Park et al., "Speech enhancement based on reinforcement learning", Department of Electronic Engineering, Hanyang University, 2018, 4 pages.
Sgeraci et al., U.S. Appl. No. 16/846,825, filed Apr. 13, 2020.
Extended European Search Report dated Sep. 24, 2021 for EP Application No. 20788289.5.
Sak et al., "Sequence Discriminative Distributed Training of Long Short-Term Memory Recurrent Neural Networks", Sep. 18, 2014, Interspeech 2014, 5pgs. XP055688080.
Hard et al., "Federated Learning for Mobile Keyboard Prediction", Nov. 8, 2018, 7pgs, XP081047935 arxiv.org.
Chinese Office Action dated Apr. 17, 2024 for CN Application No. 202080010910.1.
European Office Action dated Feb. 21, 2024 for EP Application No. 20788289.5.
India Hearing Notice dated Feb. 29, 2024 for IN Application No. 202117004671.

ELECTRONIC APPARATUS AND SERVER FOR REFINING ARTIFICIAL INTELLIGENCE MODEL, AND METHOD OF REFINING ARTIFICIAL INTELLIGENCE MODEL

CROSS-REFERENCE TO RELATED APPLICATIONS

This application is a continuation-in-part of U.S. patent application Ser. No. 16/846,825, filed on Apr. 13, 2020, in the United States Patent and Trademark Office, which claims priority under 35 U.S.C. § 119 to Korean Patent Application No. 10-2019-0043309, filed on Apr. 12, 2019, in the Korean Intellectual Property Office, Korean Patent Application No. 10-2019-0120851, filed on Sep. 30, 2019, in the Korean Intellectual Property Office, and Korean Patent Application No. 10-2020-0044591, filed on Apr. 13, 2020, in the Korean Intellectual Property Office, the contents of which are incorporated by reference herein in their entireties.

BACKGROUND

1. Field

The disclosure relates to an electronic apparatus and server for refining an artificial intelligence (AI) model stored in the electronic apparatus, and a method of refining an AI model.

2. Description of Related Art

An artificial intelligence (AI) system using machine learning and performing various operations according to various types of context information indicating various contexts of a user or an electronic apparatus possessed by the user, for example, information about a state of the electronic apparatus or information about a surrounding environment of the electronic apparatus, is provided.

Because context information of the electronic apparatus may continuously change over time, an AI model may be continuously refined according to the changed context information. Thus, the AI model may be continuously refined based on various types of context information collected in real-time, such that a suitable operation may be performed by the AI model according to the context information.

The refining of the AI model may be performed in a server having better performance than the electronic apparatus possessed by the user, in terms of a throughput and a data size used for learning. For example, the AI model stored in the electronic apparatus may also be additionally refined, based on a result of refining the AI model by the server. Thus, to refine the AI model, the electronic apparatus may transmit the context information of the electronic apparatus.

However, because the context information of the electronic apparatus may include personal information, biometric information, secret information, and financial information, which include sensitive information of the user, serious damage to the user may occur when the context information is leaked during a transmission process.

SUMMARY

Embodiments of the disclosure provide an electronic apparatus and server for refining an artificial intelligence (AI) model stored in the electronic apparatus, and a method of refining an AI model.

Embodiments of the disclosure also provide a non-transitory computer-readable recording medium having recorded thereon a program for executing the method on a computer.

Additional features will be set forth in part in the description which follows and, in part, will be apparent from the description.

According to an example embodiment of the disclosure, a method, performed by an electronic apparatus, of refining an artificial intelligence (AI) model, includes: detecting that information about a context of an electronic apparatus used to refine a local model stored in the electronic apparatus is changed; determining a gradient for refining the local model based on the changed information about the context; refining the local model based on the determined gradient; transmitting the gradient to a server; receiving, from the server, information about a global model refined based on the gradient; and refining the local model, based on the received information.

According to another example embodiment of the disclosure, an electronic apparatus configured to refine an artificial intelligence (AI) model, includes: a memory storing a local model; at least one processor configured to: detect that information about a context of the electronic apparatus used to refine the local model is changed; determine a gradient for refining the local model, based on the changed information about the context; and refining the local model, based on the determined gradient; and a communicator comprising communication circuitry configured to: transmit the gradient to a server and receive, from the server, information about a global model refined based on the gradient, wherein the at least one processor is further configured to refine the local model based on the information received from the server.

According to another example embodiment of the disclosure, a non-transitory computer-readable recording medium has recorded thereon a program for implementing the method.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
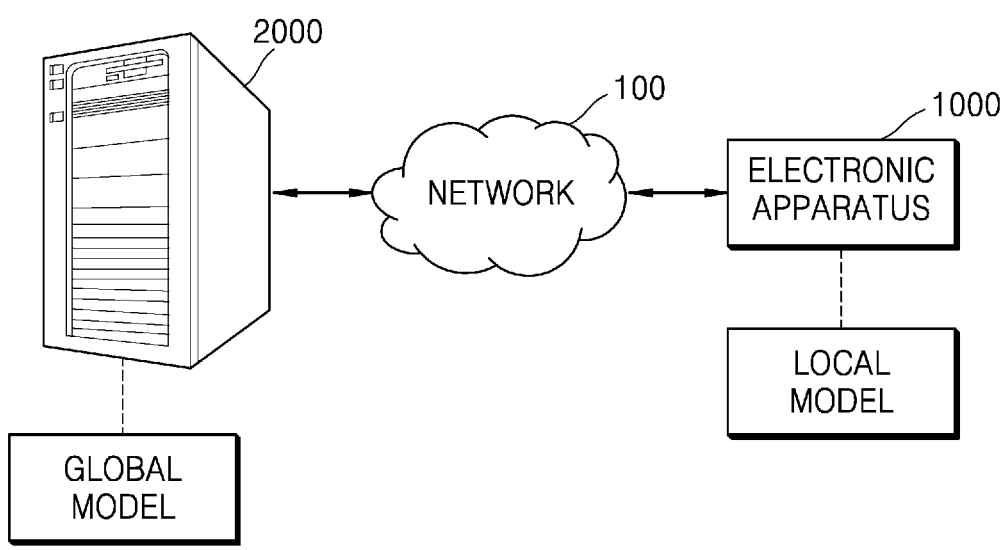
FIG. 1 is a diagram illustrating an example system for performing various operations using a local model of an electronic apparatus, according to an embodiment of the disclosure.

Hereinafter, various example embodiments of the disclosure will be described in greater detail with reference to the accompanying drawings. However, the disclosure may be implemented in various different forms and is not limited to the example embodiments of the disclosure described herein. In the drawings, parts irrelevant to the description may be omitted to clearly describe the disclosure, and like reference numerals may designate like elements throughout the specification.

Throughout the disclosure, the expression "at least one of a, b or c" indicates only a, only b, only c, both a and b, both a and c, both b and c, all of a, b, and c, or variations thereof.

Throughout the disclosure, when a part is "connected" to another part, the part may not only be "directly connected" to the other part, but may also be "electrically connected" to the other part with another element in between. In addition, when a part "includes" a certain component, the part may further include another component instead of excluding the other component, unless otherwise stated.

A function related to an artificial intelligence (AI) according to the disclosure may operate via a processor and a memory. The processor may include one or more processors. In this case, the one or more processors may include, for example, and without limitation, a general-purpose processor such as a central processing unit (CPU), an application processor (AP), or a digital signal processor (DSP), a dedicated graphics processor such as a graphical processing unit (GPU), a vision processing unit (VPU), a dedicated AI processor such as a neural processing unit (NPU), or the like. The one or more processors may control input data to be processed according to predefined operation rules or an AI model stored in the memory. When the one or more processors include a dedicated AI processor, the dedicated AI processor may be designed with a hardware structure specialized for processing a specific AI model.

The predefined operation rules or AI model may be generated via a training process. This may refer, for example, to the predefined operation rules or AI model set to perform according to desired characteristics (or purposes) being generated by training a basic AI model with a learning algorithm that utilizes a large number of training data. The training process may be performed by a device for performing AI or a separate server and/or system. Examples of the learning algorithm may include, for example, and without limitation, supervised learning, unsupervised learning, semi-supervised learning, and reinforcement learning, or the like, but are not limited thereto.

The AI model may include a plurality of neural network layers. Each of the neural network layers may include a plurality of nodes and weight values, and may perform a neural network arithmetic operation via an arithmetic operation between an arithmetic operation result of a previous layer and the plurality of weight values. A plurality of weight values in each of the neural network layers may be optimized by a result of training the AI model. For example, the plurality of weight values may be refined to reduce or minimize a loss or cost value obtained by the AI model during the training process. To minimize and/or reduce the loss or cost value, the plurality of weight values may be refined to minimize and/or reduce a gradient related to the loss or cost value. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

Hereinafter, various example embodiments of the disclosure will be described in greater detail with reference to accompanying drawings.

FIG. 1 is a diagram illustrating an example system for performing various operations using a local model of an electronic apparatus 1000, according to an embodiment of the disclosure.

As shown in FIG. 1, the system according to an embodiment of the disclosure may include the electronic apparatus 1000 and a server 2000. The electronic apparatus 1000 according to an embodiment of the disclosure may refine a local model stored in the electronic apparatus 1000 such that a result suitable for a context of the electronic apparatus 1000 is output based on information about the context of the electronic apparatus 1000 collected by the electronic apparatus 1000, and the electronic apparatus 1000 may perform various operations based on the refined local model.

The local model of the electronic apparatus 1000 according to an embodiment of the disclosure may include, for example, an artificial intelligence (AI) model that may be continuously refined in the electronic apparatus 1000, based on the information about the context of the electronic apparatus 1000, and used for various operations.

The electronic apparatus 1000 according to an embodiment of the disclosure may refine the local model by optimizing a plurality of weight values included in a plurality of neural network layers included in the local model, based on the information about the context. For example, the electronic apparatus 1000 may refine the local model such that a difference between prediction information outputtable through the local model and observation information corresponding to the prediction information is the lowest and/or relatively low, based on the information about the context.

The observation information according to an embodiment of the disclosure may include, for example, information indicating an answer to the prediction information and may be determined based not only on the information about the context of the electronic apparatus 1000, but also on various types of information related to an output result of the local model.

The information about the context of the electronic apparatus 1000 may include context information collected from the electronic apparatus 1000, information about a state of the electronic apparatus 1000, information about a user of the electronic apparatus 1000, and information about a surrounding environment of the electronic apparatus 1000.

According to an embodiment of the disclosure, the context information collected from the electronic apparatus 1000 may include various types of information used to refine the local model such that a result suitable to a current context of the electronic apparatus 1000 is output. The context information may include, for example, and without limitation, the information about the state of the electronic apparatus 1000, the information about the user of the electronic apparatus 1000, the information about the surrounding environment of the electronic apparatus 1000, or the like.

According to an embodiment of the disclosure, the prediction information outputtable to the local model and the corresponding observation information may be obtained, based on the context information. The electronic apparatus 1000 according to an embodiment of the disclosure may refine the local model by modifying values included in the local model such that the difference between the observation information and the prediction information is the lowest and/or relatively low.

The information about the state of the electronic apparatus 1000, according to an embodiment of the disclosure, may include various types of information about the state of the electronic apparatus 1000, such as, for example, and without limitation, information about an operation state of the electronic apparatus 1000, information about a network connection state of the electronic apparatus 1000, information about a state of an operating system (OS) or application installed in the electronic apparatus 1000, information about a location of the electronic apparatus 1000, information about a movement state of the electronic apparatus 1000, information about a hardware state included in the electronic apparatus 1000, or the like.

The information about the user of the electronic apparatus 1000 according to an embodiment of the disclosure may include, for example, and without limitation, information about features of the user, various types of privacy information of the user, such as information about personal details of the user, information about an account of a service to which the user is subscribed, information about a life pattern of the user, or the like. However, the information about the user is not limited thereto and may include various types of information about the user.

The information about the surrounding environment of the electronic apparatus 1000 according to an embodiment of the disclosure may include, for example, various types of information about the surrounding environment of the electronic apparatus 1000, such as, for example, and without limitation, information about an object present around the electronic apparatus 1000, information about illumination of the surrounding environment of the electronic apparatus 1000, or the like.

An operation performable based on the local model, according to an embodiment of the disclosure, may include various operations performable by the electronic apparatus 1000. For example, and without limitation, the operation may include an operation of recommending an item, an operation of recognizing an object around the electronic apparatus 1000, an operation of performing voice recognition on an audio signal collected by the electronic apparatus 1000, or the like. However, the operation performable based on the local model, according to an embodiment of the disclosure, is not limited thereto, and may include various operations performable by the electronic apparatus 1000 using the local model.

The electronic apparatus 1000 according to an embodiment of the disclosure may not only perform arithmetic operations for performing various operations using the local model, but may also perform training for increasing accuracy of the arithmetic operations using the local model, based on the information about the context of the electronic apparatus 1000. The electronic apparatus 1000 according to an embodiment of the disclosure may train the local model and derive an arithmetic operation optimized to a use pattern of the electronic apparatus 1000, using the trained local model. According to an embodiment of the disclosure, at least one local model corresponding to each operation may be present and each operation may be performed according to the at least one local model. For example, the electronic apparatus 1000 may obtain at least one local model corresponding to an operation (for example, item recommendation, object recognition, or voice recognition) to be performed by the electronic apparatus 1000 among a plurality of local models, and perform the operation based on the obtained local model. However, an embodiment of the disclosure is not limited thereto, and a plurality of different operations may be performed according to a single local model.

The electronic apparatus 1000 according to an embodiment of the disclosure may obtain the at least one local model from a memory included in the electronic apparatus 1000 or receive the at least one local model from an external source. For example, the electronic apparatus 1000 may obtain the local model by reading the memory. The electronic apparatus 1000 may receive a global model from the server 2000 outside and obtain the received global model as the local model of the electronic apparatus 1000. However, an embodiment of the disclosure is not limited thereto, and the electronic apparatus 1000 may obtain the local model via any one of various methods.

For example, when the local model for performing a certain operation is not stored in the electronic apparatus 1000, the electronic apparatus 1000 may receive, from the server 2000, information about the global model for performing the certain operation. The electronic apparatus 1000 may obtain and store the local model based on the information about the global model received from the server 2000.

According to an embodiment of the disclosure, the electronic apparatus 1000 may request the server 2000 for the global model for performing the certain operation, receive the global model from the server 2000, and store the received global model as the local model of the electronic apparatus 1000. The local model stored in the electronic apparatus 1000 may be continuously refined, based on the context information collected by the electronic apparatus 1000. However, an embodiment of the disclosure is not limited thereto, and the local model stored in the electronic apparatus 1000 may be continuously refined, based not only on the context collected by the electronic apparatus 1000, but also on various types of data required to refine the local model.

The electronic apparatus 1000 according to an embodiment of the disclosure may include, for example, an apparatus for performing various operations using the local model according to an AI technology, and may be implemented in various forms. For example, the electronic apparatus 1000 described herein may include, for example, and without limitation, a digital camera, a smart phone, a laptop computer, a tablet personal computer (PC), an electronic book terminal, a digital broadcast terminal, a personal digital assistant (PDA), a portable multimedia player (PMP), a navigation device, an MP3 player, an AI speaker, a robot cleaner, a home appliance, or the like, but is not limited thereto.

The electronic apparatus 1000 described herein may include a wearable device of the user. Examples of the wearable device include, for example, and without limitation, an accessory type device (for example, a watch, a ring, a wrist band, an ankle band, a necklace, glasses, or a contact lens), a head-mounted device (HMD), a textile or apparel integrated device (for example, electronic clothing), a body-attachable device (for example, a skin pad), a bio-implant type device (for example, an implantable circuit), or the like, but are not limited thereto.

The refining of the local model according to an embodiment of the disclosure may be performed via multiple operations. For example, the refining of the local model may include a first operation of refining the local model, based on the information about the context collected by the electronic apparatus 1000. The refining of the local model may include a second operation of refining the local model again, based on the information received from the server 2000 upon transmitting the gradient for the refined local model to the server 2000.

According to an embodiment of the disclosure, the gradient of the local model may include information for refining the local model. For example, the gradient may include information related to a case in which the difference between the observation information and the prediction information is the lowest and/or relatively low.

For example, the electronic apparatus 1000 may obtain a loss function indicating the difference between the observation information and the prediction information, and obtain the gradient indicating information related to a point where a value of the loss function is the lowest. For example, the lowest value of the loss function may be detected by finding a point where a slope of the loss function is the lowest. A slope value of the loss function according to an embodiment of the disclosure may be obtained, for example, from a partial differential value for each variable included in the prediction information.

The electronic apparatus 1000 according to an embodiment of the disclosure may determine the prediction information of the loss function, which corresponds to the point where the value of the loss function is the lowest, using the gradient. The electronic apparatus 1000 may refine the local model by modifying parameters (for example, a weight value or bias for each node) included in the local model such that the determined prediction information is output by the local model.

The server 2000 according to an embodiment of the disclosure may refine the global model stored in the server 2000, based on the gradient transmitted from the electronic apparatus 1000, and transmit information about the refined global model to the electronic apparatus 1000. For example, the server 2000 may refine the global model such that the prediction information corresponding to slope information of the loss function included in the gradient is output by the global model. In this example, the observation information may include information indicating the answer to the prediction information of the global model and obtained based on various types of information related to an output result of the global model. Thus, the electronic apparatus 1000 according to an embodiment of the disclosure may refine the local model again, based on the information about the refined global model received from the server 2000 in the second operation.

The global model according to an embodiment of the disclosure may be refined according to relatively excellent learning capability and arithmetic operation capability of the server 2000, based on the various types of information collected by the server 2000. The global model according to an embodiment of the disclosure may be continuously trained and stored, based on the various types of information collected by the server 2000 via various methods, before an operating operation of the local model is performed. However, an embodiment of the disclosure is not limited thereto, and the global model may be trained via various methods and pre-stored in the server 2000, and the global model stored in the server 2000 may be used to refine the local model according to an embodiment of the disclosure.

The various types of information collected by the server 2000 may include, for example, and without limitation, information collected by a plurality of external apparatuses other than the electronic apparatus 1000, information collected on the Internet, or the like. However, an embodiment of the disclosure is not limited thereto, and the various types of information collected by the server 2000 may include various types of information collected via various methods.

Thus, the global model according to an embodiment of the disclosure may exhibit better performance than the local model in performing an operation according to an embodiment of the disclosure. The electronic apparatus 1000 according to an embodiment of the disclosure may refine the local model again, based on the global model refined by the server 2000 with relatively excellent learning capability and more pieces of information. For example, the server 2000 may refine the global model using not only data received from the electronic apparatus 1000, but also data received from a plurality of other external apparatuses. Also, the global model of the server 2000, according to an embodiment of the disclosure may be refined when the information about the context of the server 2000 is changed. Thus, according to an embodiment of the disclosure, the global model of the server 2000 may be refined based on the information about the context of the server 2000 even when data (for example, the gradient of the local model refined by the electronic apparatus 1000 or another external apparatus) is not received from an external source). Accordingly, the electronic apparatus 1000 according to an embodiment of the disclosure may provide a better service to the user using the local model refined using the information about the global model.

The local model refined again based on the information about the refined global model, according to an embodiment of the disclosure, may be refined considering that the global model refined by the server 2000 may include, for example, an AI model refined considering context information of not only the electronic apparatus 1000 but also of other external apparatuses. For example, the local model may be refined such that a result that does not conflict with the context of the electronic apparatus 1000 is output by the local model. Accordingly, even when the local model according to an embodiment of the disclosure is refined again based on the information about the global model, the local model may be refined such that a suitable operation is performed according to individual context information of the electronic apparatus 1000 different from the context of other external apparatuses.

The electronic apparatus 1000 according to an embodiment of the disclosure may transmit the gradient instead of the context information to the server 2000 to prevent and/or reduce sensitive information of the user included in the context information from being leaked. A time consumed to refine the local model may be reduced when an amount of data transmitted to the server 2000 is reduced.

According to an embodiment of the disclosure, the local model may be refined based on current context information collected by the electronic apparatus 1000 such that a result suitable to a current context of the electronic apparatus 1000 is output by the local model.

According to an embodiment of the disclosure, the context information collected from the electronic apparatus 1000 may include various types of information used to refine the local model such that a result suitable to a current context of the electronic apparatus 1000 is output. For example, and without limitation, the context information may include the information about the state of the electronic apparatus 1000, the information about the user of the electronic apparatus 1000, the information about the surrounding environment of the electronic apparatus 1000, feedback information of the user regarding a result output by the local model, or the like.

The user according to an embodiment of the disclosure may provide the feedback information regarding an operation performed by the local model. The feedback information may include, for example, and without limitation, information input by the user, which indicates whether a recommended item, an object recognition result, a voice recognition result based on the local model, or the like, is suitable. As another example, the feedback information may further include, without limitation, rating information regarding the recommended item, the rating information input by the user, or the like. However, an embodiment of the disclosure is not limited thereto, and the feedback information may include various types of information including an opinion of the user regarding an operation performed by the local model.

The feedback information according to an embodiment of the disclosure may be collected as the context information collected by the electronic apparatus 1000, which may be used to refine the local model, and the local model may be refined based on the context information of the electronic apparatus 1000 including the feedback information. For example, when the feedback information is obtained from the user, it may be determined that the context information is changed and the local model may be refined according to the feedback information.

However, an embodiment of the disclosure is not limited thereto, and the context information collected by the electronic apparatus 1000 may include various types of context information used to refine the local model.

The context information of the electronic apparatus 1000 according to an embodiment of the disclosure may be continuously collected by the electronic apparatus 1000.

According to an embodiment of the disclosure, the electronic apparatus 1000 may continuously identify the context of the electronic apparatus 1000 and detect whether the context information of the electronic apparatus 1000 is changed.

According to an embodiment of the disclosure, the electronic apparatus 1000 may refine the local model based on changed information upon detecting the information about the context of the electronic apparatus 1000 is changed. The electronic apparatus 1000 may detect that the information about the context is changed, for example, when a specific type of information among the information about the context of the electronic apparatus 1000 collected by the electronic apparatus 1000 is changed by at least a reference value, or when a new type of information about the context of the electronic apparatus 1000 is obtained as the context information.

For example, the context information of the electronic apparatus 1000 may be changed, for example, and without limitation, when a new application is installed in the electronic apparatus 1000, when a new user using the electronic apparatus 1000 is identified, when a new operation pattern of the electronic apparatus 1000, which was not identified before, is identified, when a new form of object is recognized around the electronic apparatus 1000, when the surrounding environment of the electronic apparatus 1000 is changed, etc. However, an embodiment is not limited thereto, and the change in the information about the context of the electronic apparatus 1000 may be detected when various types of information about the user or electronic apparatus 1000, which may be used to refine the local model, is changed.

The context information of the electronic apparatus 1000 may be changed when the feedback information of the user regarding the operation, which is provided based on the local model according to an embodiment of the disclosure, is changed.

According to an embodiment of the disclosure, when the change in the information about the context of the electronic apparatus 1000 is detected, the electronic apparatus 1000 may determine whether to perform an operation of refining the local model. For example, the local model may be refined based, for example, and without limitation, on at least one of whether the electronic apparatus 1000 is currently in an idle state, whether a memory space of the electronic apparatus 1000 for refining the local model is sufficient, whether a battery of the electronic apparatus 1000 is being charged, whether a current time is midnight, or the like. However, an embodiment of the disclosure is not limited thereto, and the electronic apparatus 1000 may refine the local model, based on changed context information according to various pre-set conditions.

When it is determined that the state of the electronic apparatus 1000 is not suitable to refine the local model according to an embodiment of the disclosure, the electronic apparatus 1000 may perform the operation of refining the local model when it is determined later that the state of the electronic apparatus 1000 is suitable to refine the local model.

According to an embodiment of the disclosure, when the local model is refined based on the changed context information, the electronic apparatus 1000 may transmit the gradient used to refine the local model to the server 2000.

The gradient according to an embodiment of the disclosure may include, for example, and without limitation, at least one value generable based on the changed context information, during a process of deriving weight value, bias information of each node included in the local model, when the local model is refined based on the context information, or the like. For example, the gradient may include the information about the point where the loss function indicating the difference between the observation information and the prediction information of the local model is the lowest, based on the information about the changed context.

Upon receiving the gradient from the electronic apparatus 1000 via a network 100, the server 2000 according to an embodiment of the disclosure may refine the global model included in the server 2000 according to the gradient. The global model according to an embodiment of the disclosure may correspond to the local model of the electronic apparatus 1000, but unlike the local model, the global model may be refined by a gradient received from an external apparatus other than the electronic apparatus 1000, which is included in the server 2000.

The server 2000 according to an embodiment of the disclosure may transmit the gradient of the refined global model to the electronic apparatus 1000, and the electronic apparatus 1000 may refine the local model again, based on the gradient received from the server 2000.

The global model according to an embodiment of the disclosure may include, for example, an AI model corresponding to the local model of the electronic apparatus 1000, but the local model and the global model may have different data among various types of data, such as, for example, and without limitation, a weight value, a bias value, and the like, which configure each model, when an operation of refining each model is performed by apparatuses having different performances and specifications.

According to an embodiment of the disclosure, the global model may be refined based on the global model received from the electronic apparatus 1000. The server 2000 according to an embodiment of the disclosure may refine the global model such that new context information is applied to the global model via the gradient, considering that the gradient is obtained based on the new context information collected by the electronic apparatus 1000.

The gradient for the refined global model may be transmitted to the electronic apparatus 1000 to be used to refine the local model of the electronic apparatus 1000. A method of refining the global model and a method of refining the local model again based on the gradient for the refined global model will be described in greater detail below with reference to FIGS. 13, 16, and 17.

According to an embodiment of the disclosure, after the local model is refined again based on the information about the refined global model, the electronic apparatus 1000 may perform a certain operation (for example, item recommendation, object recognition, or voice recognition), according to the finally refined local model.

According to an embodiment of the disclosure, the electronic apparatus 1000 may perform an operation according to the local model, based on an on-device AI technology. For example, after the local model is refined based on the information received from the server 2000 according to an embodiment of the disclosure, the electronic apparatus 1000 may perform an operation according to the refined local model, according to the on-device AI technology. For example, the electronic apparatus 1000 may continuously perform the refining of the local model according to an embodiment of the disclosure by transmitting and receiving data to or from the server 2000, and when the refining of the local model according to an embodiment of the disclosure is not performed, may operate according to the on-device AI technology.

According to the on-device AI technology, the electronic apparatus 1000 may perform a certain operation (for example, item recommendation, object recognition, or voice recognition) based on the local model without transmitting or receiving data to or from the server 2000, and output a result thereof. The electronic apparatus 1000 according to an embodiment of the disclosure may perform an operation using the local model, based on various types of information collected by the electronic apparatus 1000 in real-time, without having to use big data stored in the server 2000.

According to the on-device AI technology, the electronic apparatus 1000 may make a decision by itself, based on the local model trained according to an embodiment of the disclosure and various types of data collected by itself. The electronic apparatus 1000 by the on-device AI technology does not transmit the collected data to an external device but operates autonomously, and thus is advantageous in terms of private information protection of the user and a data processing speed.

For example, the electronic apparatus 1000 may operate using the on-device AI technology without having to connect to the server 2000, according to the local model of the electronic apparatus 1000, using the information collected by the electronic apparatus 1000 without having to use big data receivable via the network 100, when an environment of the network 100 is unstable.

However, the electronic apparatus 1000 is not limited to operating according to the on-device AI technology, and may perform an operation according to an embodiment of the disclosure by transmitting and receiving data to and from the server 2000 or an external apparatus. For example, the electronic apparatus 1000 may request the server 2000 to perform an operation according to an embodiment of the disclosure, instead of performing the operation using the local model. The server 2000 according to an embodiment of the disclosure may perform an operation according to an embodiment of the disclosure, based on the global model based on a received request, and transmit a result thereof to the electronic apparatus 1000. The electronic apparatus 1000 may perform an operation according to an embodiment of the disclosure by combining the on-device AI technology and the method of transmitting and receiving data to and from the server 2000.

For example, the operation according to an embodiment of the disclosure may be performed according to the method through the server 2000 when the operation through the server 2000 may be more advantageous in terms of the data processing speed according to a network environment and the arithmetic operation capability of the electronic apparatus 1000 or when the method through the server 2000 may be more advantageous than the on-device AI technology, for example, when data not including the personal information of the user is transmitted to the server 2000.

Figure 2:
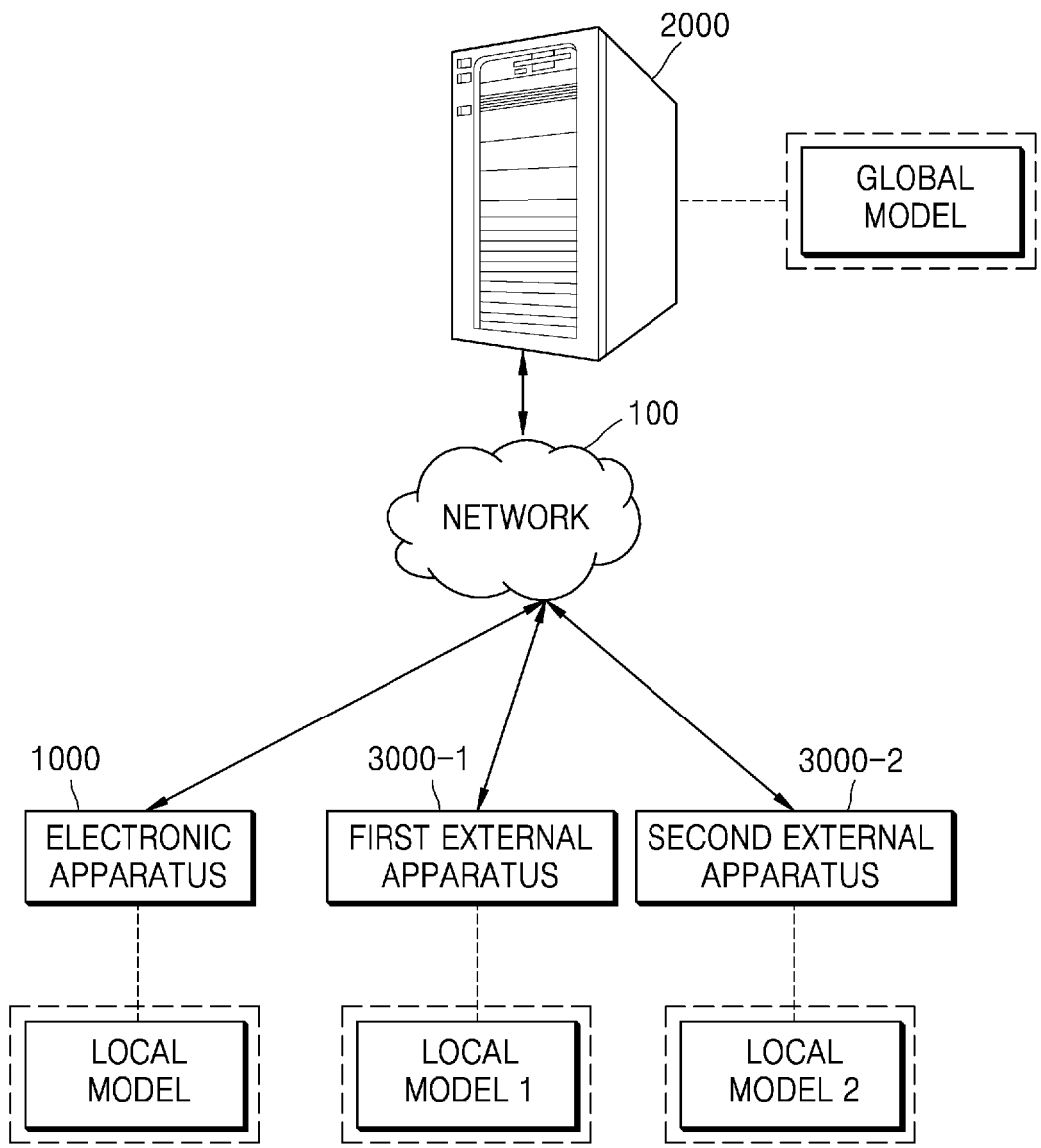
FIG. 2 is a diagram illustrating an example system for performing various operations using a local model, according to an embodiment of the disclosure.

FIG. 2 is a diagram illustrating an example system for performing various operations using a local model, according to an embodiment of the disclosure.

As shown in FIG. 2, the system according to an embodiment of the disclosure may include the electronic apparatus 1000, the server 2000, a first external apparatus 3000-1, and a second external apparatus 3000-2. The electronic apparatus 1000 and the server 2000 of FIG. 2 correspond to the electronic apparatus 1000 and the server 2000 of FIG. 1.

Like the electronic apparatus 1000, the first external apparatus 3000-1 and the second external apparatus 3000-2 according to an embodiment of the disclosure may perform various operations using first and second local models respectively stored in the first external apparatus 3000-1 and the second external apparatus 3000-2. The first and second local models respectively stored in the first external apparatus 3000-1 and the second external apparatus 3000-2 may be refined based on different pieces of context information collected respectively by the first external apparatus 3000-1 and the second external apparatus 3000-2. Thus, the first and second local models may be AI models including different pieces of data, which are suitable for the contexts of the first external apparatus 3000-1 and the second external apparatus 3000-2.

Users of the first external apparatus 3000-1, the second external apparatus 3000-2, and the electronic apparatus 1000 according to an embodiment of the disclosure may be different from each other. However, an embodiment of the disclosure is not limited thereto, and the first external apparatus 3000-1, the second external apparatus 3000-2, and the electronic apparatus 1000 may be used by the same user.

The server 2000 according to an embodiment of the disclosure may receive, from at least one of the first external apparatus 3000-1 or the second external apparatus 3000-2, at least one gradient obtained based on at least one of the first or second local model refined by respective apparatus. The first and second local models refined by the respective apparatus, according to an embodiment of the disclosure, may be refined when pieces of context information collected by the first external apparatus 3000-1 and the second external apparatus 3000-2 are changed. According to an embodiment of the disclosure, like an example in which the global model is refined based on the gradient received from the electronic apparatus 1000, the server 2000 may refine the global model of the server 2000 according to the at least one gradient received from the first external apparatus 3000-1 and the second external apparatus 3000-2.

According to an embodiment of the disclosure, after the global model is refined according to the gradient received from at least one of the first external apparatus 3000-1 or the second external apparatus 3000-2, the server 2000 may receive the gradient obtained based on the refined local model from the electronic apparatus 1000. The server 2000 may refine the global model refined according to the gradient received from at least one of the first external apparatus 3000-1 or the second external apparatus 3000-2, again based on the gradient received from the electronic apparatus 1000. The server 2000 may transmit information about the global model that is refined again to the electronic apparatus 1000.

According to an embodiment of the disclosure, because the local model is refined based on the global model to which information collected from various apparatuses is reflected, the electronic apparatus 1000 may provide a better service to the user using the local model.

The server 2000 according to an embodiment of the disclosure may refine the global model whenever the gradient is received from the electronic apparatus 1000, the first external apparatus 3000-1, and the second external apparatus 3000-2. The server 2000 may transmit information about the refined global model to an apparatus that transmitted the gradient to the server 2000.

Also, the global model of the server 2000 according to an embodiment of the disclosure may be refined when the information about the context of the server 2000 is changed. Thus, according to an embodiment of the disclosure, the global model of the server 2000 may be refined based on data (for example, the gradient of the local model refined by the electronic apparatus 1000 or another external apparatus) is not received from an external source.

According to an embodiment of the disclosure, the global model may be continuously refined based on a gradient continuously received from a plurality of apparatuses or based on the change in the information about the context of the server 2000. However, an embodiment of the disclosure is not limited thereto, and the global model may be continuously refined according to various methods, based on various types of data. However, unlike the global model that is continuously refined, the local model may not be refined for a certain period of time when the context information used to refine the local model is not changed. Thus, a difference between the local model and the global model may be increased.

The server 2000 according to an embodiment of the disclosure may determine whether a difference between a gradient of the a current global model and a gradient of a global model transmitted from the server 2000 to the electronic apparatus 1000 most recently is equal to or greater than a reference value, as the global model is continuously refined. The determining may be periodically performed by the server 2000.

When it is determined that the difference between the two gradients is equal to or greater than the reference value, the server 2000 may transmit the gradient for the global model that is recently refined to the electronic apparatus 1000. The electronic apparatus 1000 may refine the local model based on the information about the global model received from the server 2000, for example, the gradient of the global model.

Accordingly, the electronic apparatus 1000 according to an embodiment of the disclosure may receive the gradient for the global model that is most recently refined from the server 2000 without having to transmit the gradient to the server 2000. The electronic apparatus 1000 according to an embodiment of the disclosure may continuously perform the operation of refining the local model based on the global model upon receiving the gradient for the global model that is most recently refined from the server 2000, despite that the context information collected from the electronic apparatus 1000 is not changed.

However, an embodiment of the disclosure is not limited thereto, and the server 2000 may transmit the gradient for the global model currently refined to the electronic apparatus 1000 under various conditions. For example, when the server 2000 refined the global model at least a reference number of times upon receiving the gradient at least a reference number of times from at least one external apparatus excluding the electronic apparatus 1000, the server 2000 may transmit the gradient for the global model that is currently refined to the electronic apparatus 1000.

Figure 3:
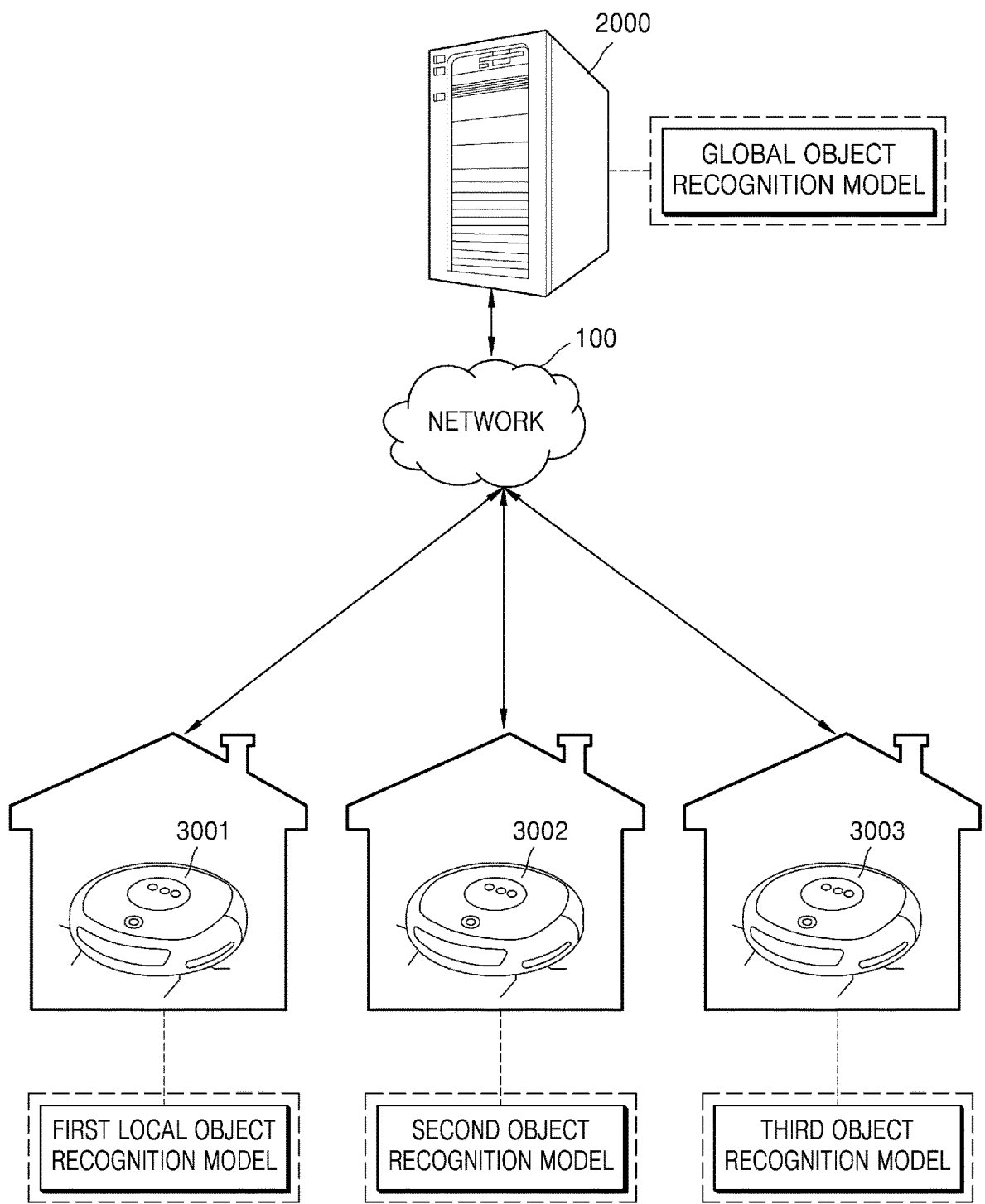
FIG. 3 is a diagram illustrating an example system for performing object recognition using a local model, according to an embodiment of the disclosure.

FIG. 3 is a diagram illustrating an example system for performing object recognition using a local model, according to an embodiment of the disclosure.

Referring to FIG. 3, the system for performing the object recognition using the local model, according to an embodiment of the disclosure, may include the server 2000 and at least one electronic apparatus, e.g., electronic apparatuses 3001, 3002, and 3003 (which may be referred to hereinafter as 3001 to 3003). Each of the electronic apparatuses 3001 through 3003 shown in FIG. 3 may correspond to the electronic apparatus 1000 shown in FIGS. 1 and 2.

The electronic apparatuses 3001 through 3003 according to an embodiment of the disclosure may be home appliances in different home environments and used by different users. Objects recognizable by the electronic apparatuses 3001 through 3003 may be different from each other because the electronic apparatuses 3001 through 3003 are in different home environments. The electronic apparatuses 3001 through 3003 according to an embodiment of the disclosure may respectively include first through third local object recognition models for performing object recognition, and the electronic apparatuses 3001 through 3003 may perform the object recognition by respectively using the first through third local object recognition models.

According to an embodiment of the disclosure, the electronic apparatuses 3001 through 3003 may refine at least one local model among the first through third local object recognition models for the object recognition, according to information about a surrounding environment of the electronic apparatuses 3001 through 3003. Thus, the first through third local object recognition models of the electronic apparatuses 3001 through 3003 according to an embodiment of the disclosure may be refined such that the object recognition suitable for different surrounding environments of the electronic apparatuses 3001 through 3003 is performed.

For example, the information about the surrounding environment used to refine the first through third local object recognition models may include, for example, and without limitation, state information, exterior information, shape information, or the like, about an object recognizable by the electronic apparatuses 3001 through 3003. However, an embodiment is not limited thereto, and the information about the surrounding environment may include various types of information usable to refine the first through third local object recognition models for the object recognition.

Context information collected in relation to a local object recognition model for object recognition among the context information collected by the electronic apparatus 1000, according to an embodiment of the disclosure, may include various types of information related to the object recognition, such as, for example, and without limitation, information about an object state present around the electronic apparatus 1000, information about an object newly recognized by the electronic apparatus 1000 among objects present around the electronic apparatus 1000, and the like.

By transmitting gradients of the first through third local object recognition models that are refined to the server 2000, the server 2000 may refine a global object recognition model according to the gradients of the first through third local object recognition models refined by the electronic apparatuses 3001 through 3003. The electronic apparatuses 3001 through 3003 may refine the first through third local object recognition models respectively stored therein, based on information about the refined global object recognition model received from the server 2000, for example, a gradient of the global object recognition model.

Figure 4:
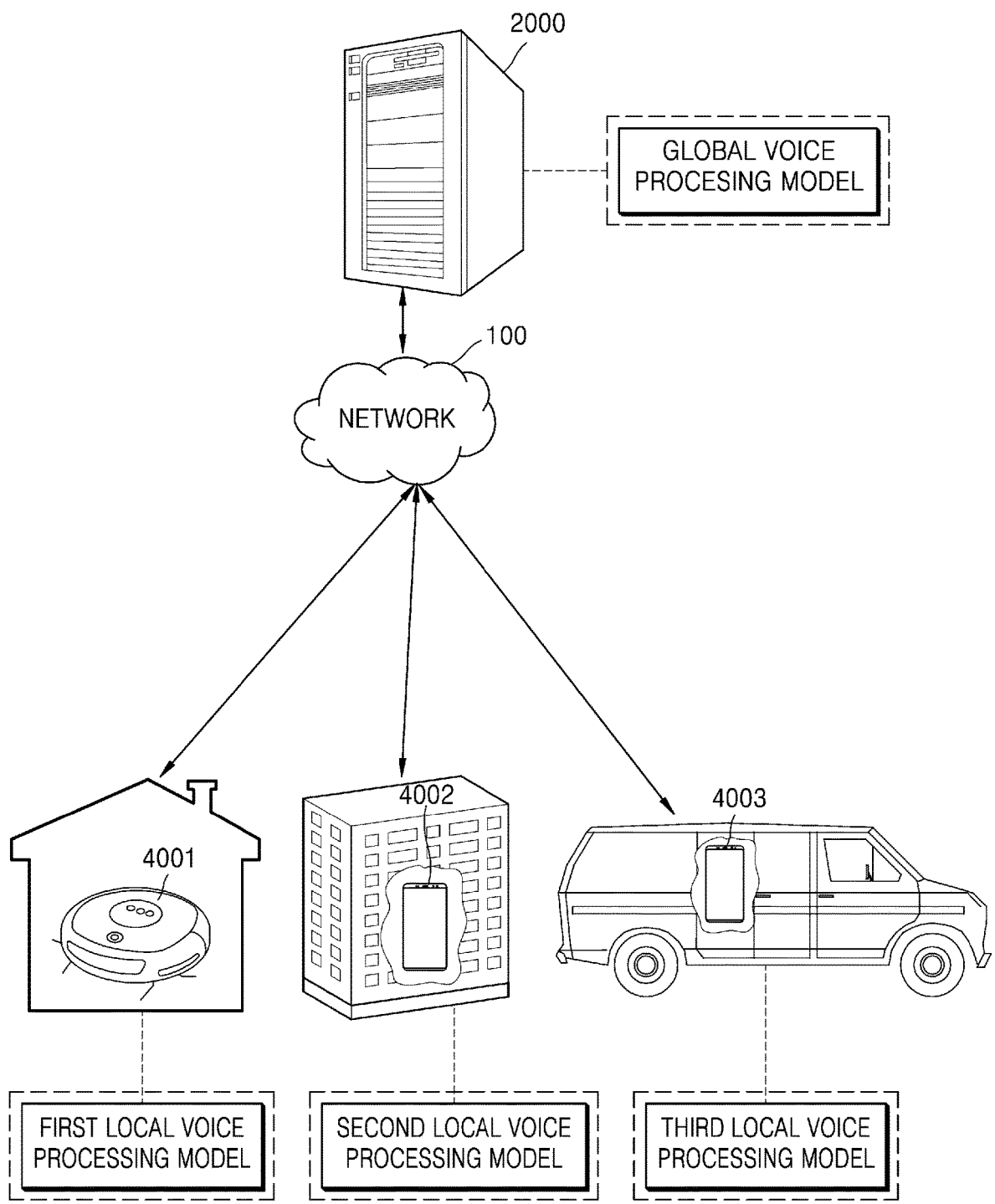
FIG. 4 is a diagram illustrating an example system for performing voice recognition using a local model, according to an embodiment of the disclosure.

FIG. 4 is a diagram illustrating an example system for performing voice recognition using a local model, according to an embodiment of the disclosure;

Referring to FIG. 4, the system for performing the voice recognition using the local model, according to an embodiment of the disclosure, may include the server 2000 and at least one electronic apparatus, e.g., electronic apparatuses 4001, 4002, and 4003 (which may be referred to hereinafter as 4001 through 4003). Each of the electronic apparatuses 4001 through 4003 shown in FIG. 4 may correspond to the electronic apparatus 1000 shown in FIGS. 1 and 2.

The server 2000 according to an embodiment of the disclosure may include a global voice processing model usable to perform an operation for voice recognition among the global model. The electronic apparatuses 4001 through 4003 according to an embodiment of the disclosure may respectively include first through third local voice processing models as local models usable for performing an operation for voice recognition.

The electronic apparatuses 4001 through 4003 according to an embodiment of the disclosure may be electronic apparatuses in different surrounding environments and used by different users. By being located in the different surrounding environments, the electronic apparatuses 4001 through 4003 may perform voice recognition based on noise information of the different surrounding environments.

Information collected in relation to the local model for voice recognition among the context information collected by the electronic apparatus 1000, according to an embodiment of the disclosure, may include various types of information related to voice recognition, such as, for example, and without limitation, information about noise generated in the surrounding environment of the electronic apparatus 1000, information about voice of the user recognizable by the electronic apparatus 1000, and the like.

For example, the electronic apparatuses 4001 through 4003 may be respectively located inside a house, an office, and a bus. By being located in different surrounding environments, the electronic apparatuses 4001 through 4003 may have different characteristics of noise included in an audio signal where voice is recognized.

According to an embodiment of the disclosure, the electronic apparatuses 4001 through 4003 may further effectively perform voice recognition according to the first through third local voice processing models, using the noise information of the surrounding environments of the electronic apparatuses 4001 through 4003. For example, the electronic apparatuses 4001 through 4003 may further effectively perform the voice recognition with respect to user's voice included in the audio signal, based on noise characteristics of the surrounding environment and voice characteristics of the user in which the voice recognition is to be performed. For example, the electronic apparatuses 4001 through 4003 may obtain relationship information between the user's voice and at least one type of noise, using the noise information of the surrounding environment, and refine the first through third local voice processing models, based on the obtained relationship information such that the voice recognition is effectively performed.

According to an embodiment of the disclosure, the electronic apparatuses 4001 through 4003 may refine the first through third local voice processing models for voice recognition, according to the information about the noise of the surrounding environments of the electronic apparatuses 4001 through 4003. Thus, the first through third local voice processing models of the electronic apparatuses 4001 through 4003 according to an embodiment of the disclosure may be refined such that the voice recognition suitable to the noise of different surrounding environments of the electronic apparatuses 4001 through 4003 is performed.

For example, the information about the noise of the surrounding environment used to refine the first through third local voice processing model may include, for example, and without limitation, information about a characteristic of at least one type of noise detectable by the electronic apparatuses 4001 through 4003, relationship information between the user's voice, at least one type of noise, and the like. However, an embodiment is not limited thereto, and the information about the noise of the surrounding environment may include various types of information usable to refine the first through third local voice processing models for the voice recognition.

According to an embodiment of the disclosure, when the information about the noise of the surrounding environment is changed, it is determined that the context information is changed, and thus the first through third local voice processing models according to an embodiment of the disclosure may be refined. For example, it may be determined that the context information according to an embodiment of the disclosure is changed, for example, and without limitation, when a new type of noise appears, when new relationship information among the relationship information between the user's voice and the at least one type of noise is obtained, or the like.

By transmitting gradients of the first through third local voice processing models that are refined to the server 2000, the server 2000 may refine the global voice processing model according to the first through third local voice processing models refined by the electronic apparatuses 4001 through 4003. The electronic apparatuses 4001 through 4003 may refine the first through third local voice processing models respectively stored therein, based on information about the refined global voice processing model received from the server 2000, for example, a gradient of the global voice processing model.

Figure 5:
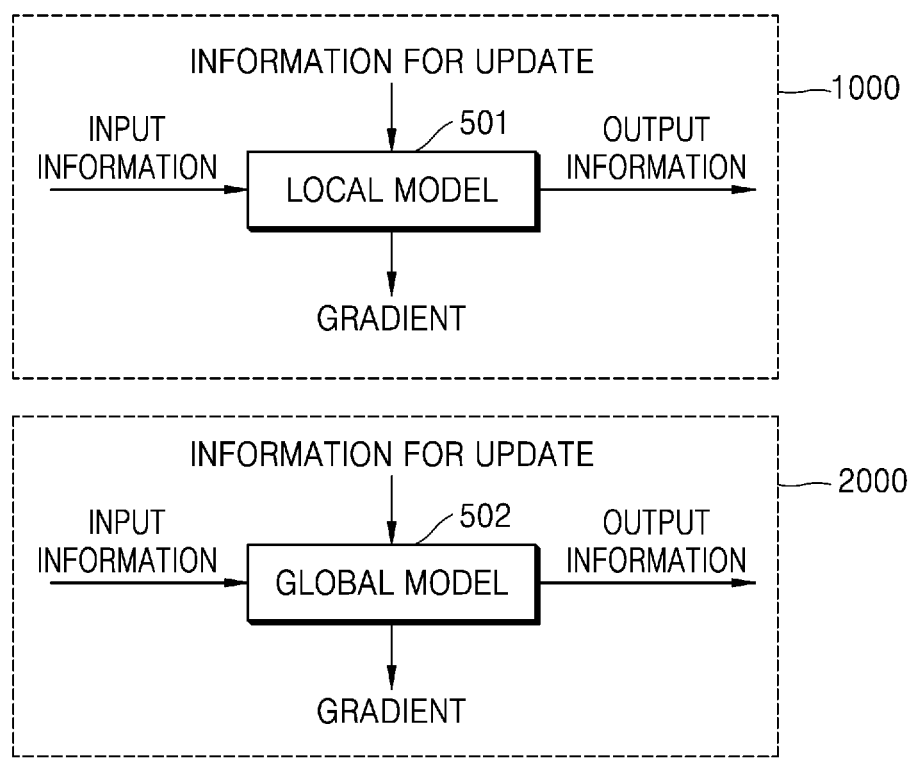
FIG. 5 is a diagram illustrating an example in which a local model and a global model are refined, according to an embodiment of the disclosure.

FIG. 5 is a diagram illustrating an example in which a local model 501 and a global model 502 are refined, according to an embodiment of the disclosure.

Referring to FIG. 5, the electronic apparatus 1000 may include the local model 501 and the server 2000 may include the global model 502.

In an example shown in FIG. 5, an arrow in a horizontal direction is related to an embodiment of the disclosure in which an operation is performed via a respective AI model, and an arrow in a vertical direction is related to an embodiment of the disclosure in which a respective AI model is refined.

According to an embodiment of the disclosure, the electronic apparatus 1000 may refine the local model 501 based on various types of collected information for refining the local model 501, and obtain a gradient based on the refined local model 501.

The information for refining the local model 501, according to an embodiment of the disclosure, may include, for example, and without limitation, changed context information regarding the electronic apparatus 1000. For example, the information for refining may include the changed context information, based on feedback information regarding a result of performing an operation by the local model 501.

According to an embodiment of the disclosure, the server 2000 may refine the global model 502, based on information for refining the global model 502 collected by the server 2000, and obtain a gradient for the refined global model 502.

The information for refining the global model 502, according to an embodiment of the disclosure, may be obtained when the server 2000 receives at least one gradient that is obtained when the local model 501 stored in the electronic apparatus 1000 or a local model stored in an external apparatus is received via the network 100. The server 2000 according to an embodiment of the disclosure may refine the global model 502, based on the received gradient.

The server 2000 according to an embodiment of the disclosure may transmit the gradient of the refined global model 502 to the electronic apparatus 1000, which transmitted the gradient of the local model 501 to the server 2000, or the external apparatus. The electronic apparatus 1000 or the external apparatus, which received the information about the refined global model 502 from the server 2000, may refine the local model 501, based on the information about the refined global model 502.

The local model 501 and the global model 502 according to an embodiment of the disclosure may output information corresponding to input information when the input information is input.

According to an embodiment of the disclosure, when operating in an on-device manner, the electronic apparatus 1000 may perform, for example, and without limitation, item recommendation, object recognition, voice recognition, or the like, according to the local model 501.

The input information input to the local model 501 according to an embodiment of the disclosure may include, for example, and without limitation, information required to perform the item recommendation, the object recognition, voice recognition, or the like. For example, the input information for the item recommendation may include information about a type of an item to be recommended. The input information for the object recognition may include sensor information currently detected by the electronic apparatus 1000, such as, for example, and without limitation, image information, infrared light detection information, and the like. The input information for the voice recognition information may include information about an audio signal currently received by the electronic apparatus 1000. The input information may include context information used to refine the local model 501. However, an embodiment of the disclosure is not limited thereto, and the input information may include various types of information for the electronic apparatus 1000 to perform an operation.

The output information output by the local model 501 according to an embodiment of the disclosure may include information about, for example, and without limitation, a result of performing the item recommendation, the object recognition, the voice recognition, or the like. For example, the output information regarding the item recommendation may include information about a recommended item and rank information of recommended items. The output information regarding the object recognition may include, for example, and without limitation, identification information, state information, and the like of an object recognized based on the sensor information. The output information regarding the voice recognition may include text information obtained as a result of performing voice recognition on an audio signal input as the input information. However, an embodiment of the disclosure is not limited thereto, and the output information may include various types of information indicating the result of performing an operation by the electronic apparatus 1000 according to the local model 501.

According to an embodiment of the disclosure, when the electronic apparatus 1000 operates in a cloud manner instead of an on-device manner, the server 2000 may perform various operations, for example, the item recommendation, the object recognition, and the voice recognition, using the global model 502 according to a request of the electronic apparatus 1000.

For example, when the electronic apparatus 1000 operates in the cloud manner, the electronic apparatus 1000 may request the server 2000 to perform the operation instead, by transmitting the input information to be input to the local model 501 to the server 2000. Based on the request of the electronic apparatus 1000, the server 2000 may perform the operation using the global model 502 and transmit a result thereof to the electronic apparatus 1000.

Figure 6:
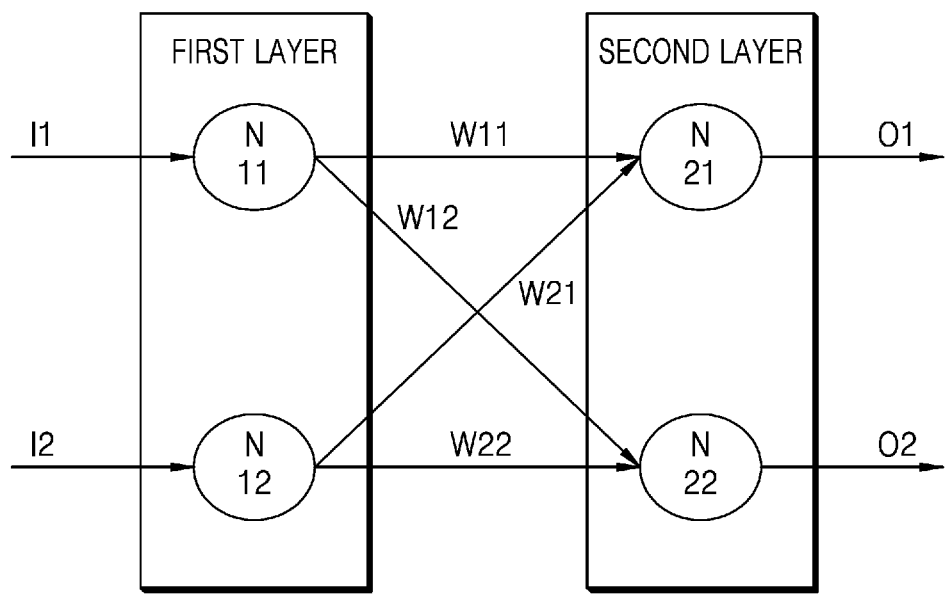
FIG. 6 is a diagram illustrating an example of a local model or a global model, according to an embodiment of the disclosure.

FIG. 6 is a diagram illustrating an example of a local model or a global model, according to an embodiment of the disclosure.

The local model or the global model according to an embodiment of the disclosure may be configured as a neural network model simulating, for example, a method by which a human brain recognizes a pattern. The electronic apparatus 1000 or the server 2000 according to an embodiment of the disclosure may provide various services to a user using the local model or the global model configured as a neural network model.

The neural network model according to an embodiment of the disclosure may include, for example, and without limitation, a deep neural network (DNN), a convolutional neural network (CNN), a recurrent neural network (RNN), a bidirectional recurrent deep neural network (BRDNN), a restricted Boltzmann machine (RBM), a deep belief network (DBN), a deep Q-network, or the like. However, an embodiment of the disclosure is not limited thereto, and the local model or the global model according to an embodiment of the disclosure may be one of various types of neural networks.

Referring to FIG. 6, the neural network model according to an embodiment of the disclosure may include at least one layer including at least one node N. For example, the neural network model may include a first layer that is an input layer and a second layer that is an output layer. The neural network model according to an embodiment of the disclosure may further include at least one hidden layer (not shown) between the input layer and the output layer. Hereinafter, for convenience of description, an example of a neural network including an input layer and an output layer excluding a hidden layer will be described by way of non-limiting example.

According to an embodiment of the disclosure, at least one input value may be input to the first layer of the neural network model. For example, values of I1 and I2 may be respectively input to nodes N11 and N12 of the first layer. According to an embodiment of the disclosure, when an input value is input to the first layer, nodes N11, N12, N21, and N22 included in the first layer and the second layer of the neural network model may be processed.

A value output from a node of each layer may be used as an input value of a next layer. For example, certain values may be input to the nodes N21 and N22 of the second layer, based on values obtained when the nodes N11 and N12 of the first layer are processed. Values output from the second layer may be output as output values from the neural network model. For example, O1 and O2 that are the values output from the second layer may be output as the output values of the neural network model.

The electronic apparatus 1000 according to an embodiment of the disclosure may input a value of input information to an input layer of the local model. The electronic apparatus 1000 may provide various services (for example, item recommendation, object recognition, and voice recognition) to the user, based on a value output from an output layer of the local model.

According to an embodiment of the disclosure, at least one piece of edge data may be obtained from one node when different weight values are applied to one value output from one node. The edge data is data obtainable when at least one weight value is applied to one value output from one node. The edge data may be obtained by the number of weight values applied to one value. Accordingly, the value output from each node of the first layer may be input to a node of a next layer after being converted into at least one piece of edge data. For example, pieces of edge data obtained by applying W11 and W12 that are different weight values to the value output from the node N11 may be respectively input to the nodes N21 and N22 of the second layer. Pieces of edge data obtained by applying W21 and W22 that are different weight values to the value output from the node N12 may be respectively input to the nodes N21 and N22 of the second layer.

According to an embodiment of the disclosure, when the local model is refined, at least one weight value applicable to each node may be changed. A gradient according to an embodiment of the disclosure may include information obtained during an arithmetic operation for deriving an optimum weight value applied to each node.

According to an embodiment of the disclosure, a loss function or a cost function may be used to derive an optimum weight value W11' (not shown) from the weight value W11 of the local model before being refined.

According to an embodiment of the disclosure, a loss value determinable via the loss function may be determined based on a difference between observation information outputtable by the local model and observation information indicating an answer to the prediction information. The observation information according to an embodiment of the disclosure may be determined as information corresponding to the prediction information outputtable by the local model, based on currently collected context information.

According to an embodiment of the disclosure, the local model may be refined by replacing the weight value W11 of the local model by the weight value W11' where the loss value is the lowest.

According to an embodiment of the disclosure, a mean squared error function or a cross entropy error function may be used as the loss function. However, an embodiment of the disclosure is not limited thereto, and various types of functions may be used as the loss function.

The mean squared error function and the cross entropy error function according to an embodiment of the disclosure may be represented by Equation 1 below. In Equation 1, y and t respectively indicate a value of prediction information and a value of observation information.

$$E = \frac{1}{2}\sum_k (y_k - t_k)^2 \quad \text{(Mean squared error function)} \qquad \text{[Equation 1]}$$

$$E = -\sum_k t_k \log y_k \quad \text{(Cross entropy error function)}$$

The electronic apparatus 1000 according to an embodiment of the disclosure may determine a parameter (for example, a weight value of each node of the local model or a bias value) that minimizes and/or reduces the loss value obtained by the loss function to derive the optimum weight value W11'. For example, when a loss value (e.g., a result value of the loss function) is lowest at a point where a slope is at a minimum in a graph of the loss function in which a first prediction value among a plurality of prediction values of the prediction information is a variable and other prediction values are constants, the electronic apparatus 1000 may obtain the lowest value of a slope as a first gradient.

According to an embodiment of the disclosure, second through n-th gradients corresponding to respective prediction values may be obtained when the loss value is lowest, in the same manner for second through n-th prediction values. Accordingly, the electronic apparatus 1000 may obtain a gradient including the first through n-th gradients as the gradient of the refined local model.

The electronic apparatus 1000 according to an embodiment of the disclosure may refine the local model, based on the parameter corresponding to the at least one prediction value when the loss value is the lowest.

However, an embodiment of the disclosure is not limited thereto, and the gradient may include various types of values obtained during a process of deriving various types of information configuring the refined local model when the local model is refined. For example, the gradient may be may include differences between at least one weight value applicable to nodes configuring the refined local model and weight values of the local model before being refined.

The gradient of the global model according to an embodiment of the disclosure may be obtained like the gradient of the local model. For example, after the global model is refined, slope information of the loss function corresponding to the prediction information obtainable by the refined global model may be obtained as the gradient of the refined global model. Also, the gradient of the global model may include differences between at least one weight value applicable to nodes configuring the refined global model and weight values of the global model before being refined.

Figure 7:
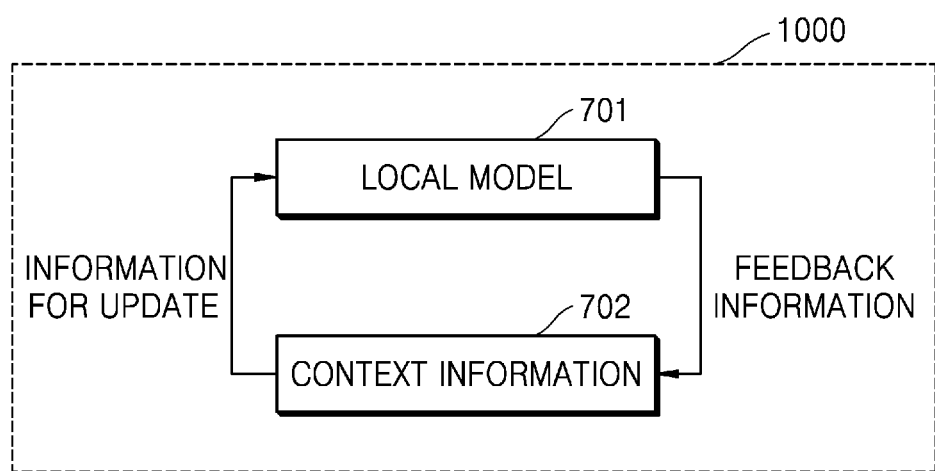
FIG. 7 is a diagram illustrating an example operation of an electronic apparatus, according to an embodiment of the disclosure.

FIG. 7 is a diagram illustrating an example operation of the electronic apparatus 1000, according to an embodiment of the disclosure.

Referring to FIG. 7, the electronic apparatus 1000 may perform an operation of recommending an item using a local model 701 and context information 702.

According to an embodiment of the disclosure, the electronic apparatus 1000 may perform a certain operation (for example, item recommendation, object recognition, or voice recognition) via the local model 701 and the context information 702 may be changed based on a result of the operation. For example, the context information 702 may be changed based on feedback information of a user regarding the result of the operation.

The feedback information of the user regarding the operation according to the local model 701 according to an embodiment of the disclosure may be used to refine the local model 701, as the changed context information 702.

Thus, according to an embodiment of the disclosure, the certain operation (for example, item recommendation, object recognition, or voice recognition) may be performed when the context information 702 is input to the local model 701, but when the context information 702 is changed, the local model 701 may be refined based on the changed context information 702.

According to an embodiment of the disclosure, the performing of the operation via the local model 701, the changing of the context information 702 based on the feedback information generated as the result of the operation, and the transmitting of the changed context information 702 to the local model 701 as information for refining of the local model 701 may be considered to be one step.

At least one of the refining of the local model 701 or the operation performed by the local model 701, according to an embodiment of the disclosure, may be performed whenever one step is performed.

According to an embodiment of the disclosure, a gradient may be generated based on the local model 701 finally refined after a pre-determined number of steps is repeatedly performed. The electronic apparatus 1000 according to an embodiment of the disclosure may receive information about a global model by transmitting the generated gradient to the server 2000, and refine the local model 701 again based on the received information.

A gradient of a local model or a global model, according to an embodiment of the disclosure, may further include information obtained based on information about a policy or a value.

The information about the policy of the local model may include information about which operation may be selected as an output value according to a value input to the local model. For example, the information about the policy ($\pi$) may include information for indicating at least one of a weight value or a bias value for each node described above. For example, the information about the policy may be represented by $\pi(a_t|s_t;\theta)$, wherein a indicates an operation as an output value of the local model, s denotes state information as an input value of the local model, t denotes time, and $\theta$ denotes a parameter.

The information about the value of the local model may include information about a value indicating how suitable is the information about the policy to perform the operation according to the local model. For example, the information about the value (V) may be represented by $V(S_t, \theta_v)$.

For example, information ($L_p$) about data of the policy of the local model and information ($L_v$) about data of the value may be respectively obtained according to Equations 2 and 4 below.

In Equation 2, $H(\pi(\theta))$ denotes an entropy function for a policy for improving model exploration, and $\beta$ denotes a parameter for adjusting the intensity of an entropy regularization term.

$$L_p = -\log(\pi(s;\theta))A(s,a;\theta,\theta_v) - \beta H(\pi(\theta)))  \quad \text{[Equation 2]}$$

$A(s,a;\theta,\theta_v)$ of Equation 2 may be obtained according to Equation 3 below. In Equation 3, k denotes the total number of times the local model is refined and $\gamma$ denotes a discount factor.

$$A(s_t, a_t; \theta_i \theta_v) = \quad \text{[Equation 3]}$$
$$R_t - V(s_t; \theta_v) = \sum_{i=0}^{k-1} \gamma^i r_{t+1} + \gamma^k V(s_{t+k}; \theta_v) - V(s_t; \theta_v)$$

In Equation 4, R denotes the feedback information of the user.

$$L_v = \Sigma(R - V(s;\theta))^2 \quad \text{[Equation 4]}$$

However, an embodiment is not limited thereto, and the gradient may include various types of information usable to determine a value related to at least one node configuring the local model.

Figure 8:
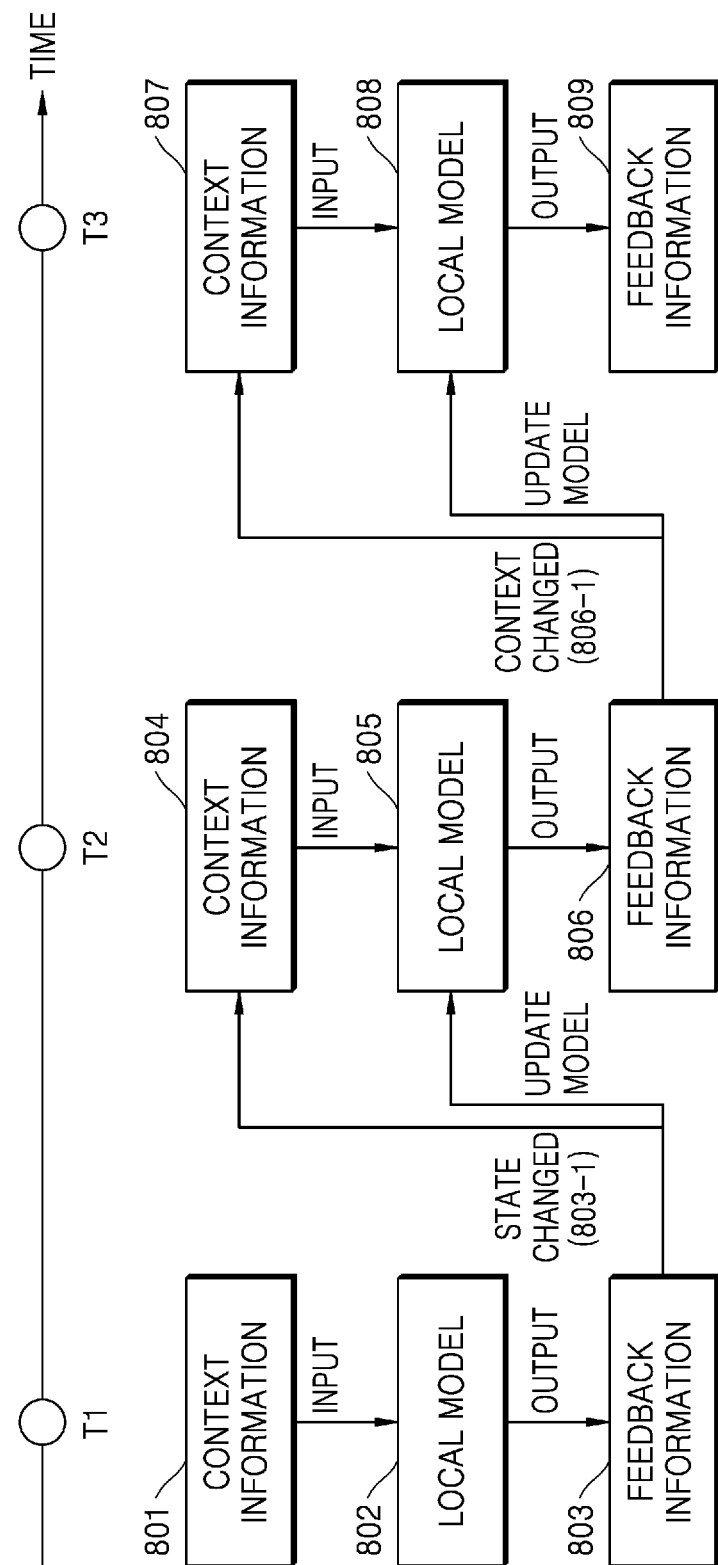
FIG. 8 is a diagram illustrating an example in which a local model is refined according to time, according to an embodiment of the disclosure.

FIG. 8 is a diagram illustrating an example in which a local model is refined according to time, according to an embodiment of the disclosure.

Referring to FIG. 8, the electronic apparatus 1000 may perform an operation by inputting context information 801 to a local model 802 at a time point T1, and obtain feedback information 803 of a user regarding the performed operation. According to an embodiment of the disclosure, the context information 801 of the electronic apparatus 1000 is input to the local model 802 as input information such that a certain operation is performed. However, an embodiment of the disclosure is not limited thereto, and various types of information required to perform an operation may be input to the local model 802 in addition to the context information 801.

Context information collected in relation to a local model for item recommendation among context information collected by the electronic apparatus 1000 according to an embodiment of the disclosure may include various types of information related to the item recommendation, such as, for example, and without limitation, information about at least one item recommendable by the local model, information about an interaction between a user and at least one item, or the like.

The information about the at least one item recommendable by a local model may include, for example, and without limitation, an application, a moving image, a still image, a text file, a webpage, or the like. The item may be link information or index information connected to an image of the item. The item may be configured in a form of an object for the use of a service. The object for the use of a service, according to an embodiment of the disclosure, may denote a user interface for using a service of a service provider. For example, the object for the use of a service may include, for example, and without limitation, an icon, text, a user interface including an image and link information, a description about a function of the object, or the like, for using a service provided by a content provider.

The information about the interaction between the user and the at least one item may include, for example, and without limitation, information about a history of using the at least one item by the user, feedback information of the user regarding an item recommended by the local model, information about a method, time and place of using the at least one item by the user, information about a signal input by the user for the at least one item, or the like.

The feedback information 803 according to an embodiment of the disclosure may be generated based on information output according to the operation performed via the local model 802. For example, the feedback information 803 may include information input by the user with respect to a result of the operation performed according to the local model 802. For example, in case of item recommendation, the feedback information 803 may include information about which item the user selected among items recommended as the output information of the local model 802, information about whether the user selected a recommended item, and rank information of recommended items input by the user. In case of object recognition and voice recognition, the feedback information 803 may include information about an opinion of the user about whether a result of the object recognition or voice recognition is suitable, as the output information of the local model 802.

At a time point T2, context information 804 may be changed based on a state 803-1 changed according to the feedback information 803 of the user. For example, the electronic apparatus 1000 may change information about an interaction between the user and an item among the context information 804, based on the feedback information 803 of the user. The electronic apparatus 1000 may change information about whether each item is recommended and finally selected by the user, as feature information about each item, among the context information 804, based on a result of performing item recommendation. The electronic apparatus 1000 may change information about a result of object recognition or voice recognition among the context information 804, based on the feedback information 803 of the user regarding a result of performing the object recognition or voice recognition.

However, an embodiment of the disclosure is not limited thereto, and the context information 804 may be changed via various methods, based on the state 803-1 changed according to the feedback information 803 of the user.

Also, at the time point T2, a local model 805 may be refined based on the feedback information 803. The electronic apparatus 1000 may refine the local model 805 by reflecting the feedback information 803 of the user.

At the time point T2, when the context information 801 is changed and the local model 802 is refined, the electronic apparatus 1000 may perform an operation by inputting the context information 804 of which the change is completed to the local model 805 and obtain feedback information 806 of the user regarding the performed operation, as in the time point T1.

Ata time point T3, the context information 804 may be changed and the local model 805 may be refined in the same manner as the time points T1 and T2. For example, at the time point T3, context information 807 may be changed based on a state 806-1 changed according to the feedback information 806 of the user. At the time point T3, when the context information 804 is changed and the local model 805 is refined, the electronic apparatus 1000 may perform an operation by inputting the context information 807 of which the change is completed to a local model 808 and obtain feedback information 809 of the user regarding the performed operation, as in the time points T1 and T2.

Figure 9:
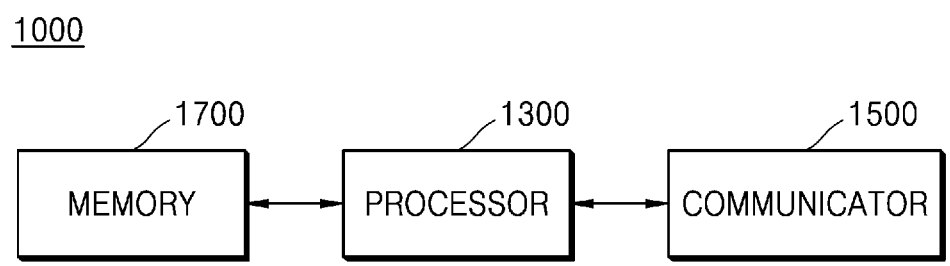
FIG. 9 is a block diagram illustrating an example configuration of an example electronic apparatus, according to an embodiment of the disclosure.

FIG. 9 is a block diagram illustrating an example configuration of the electronic apparatus 1000, according to an embodiment of the disclosure.

Figure 10:
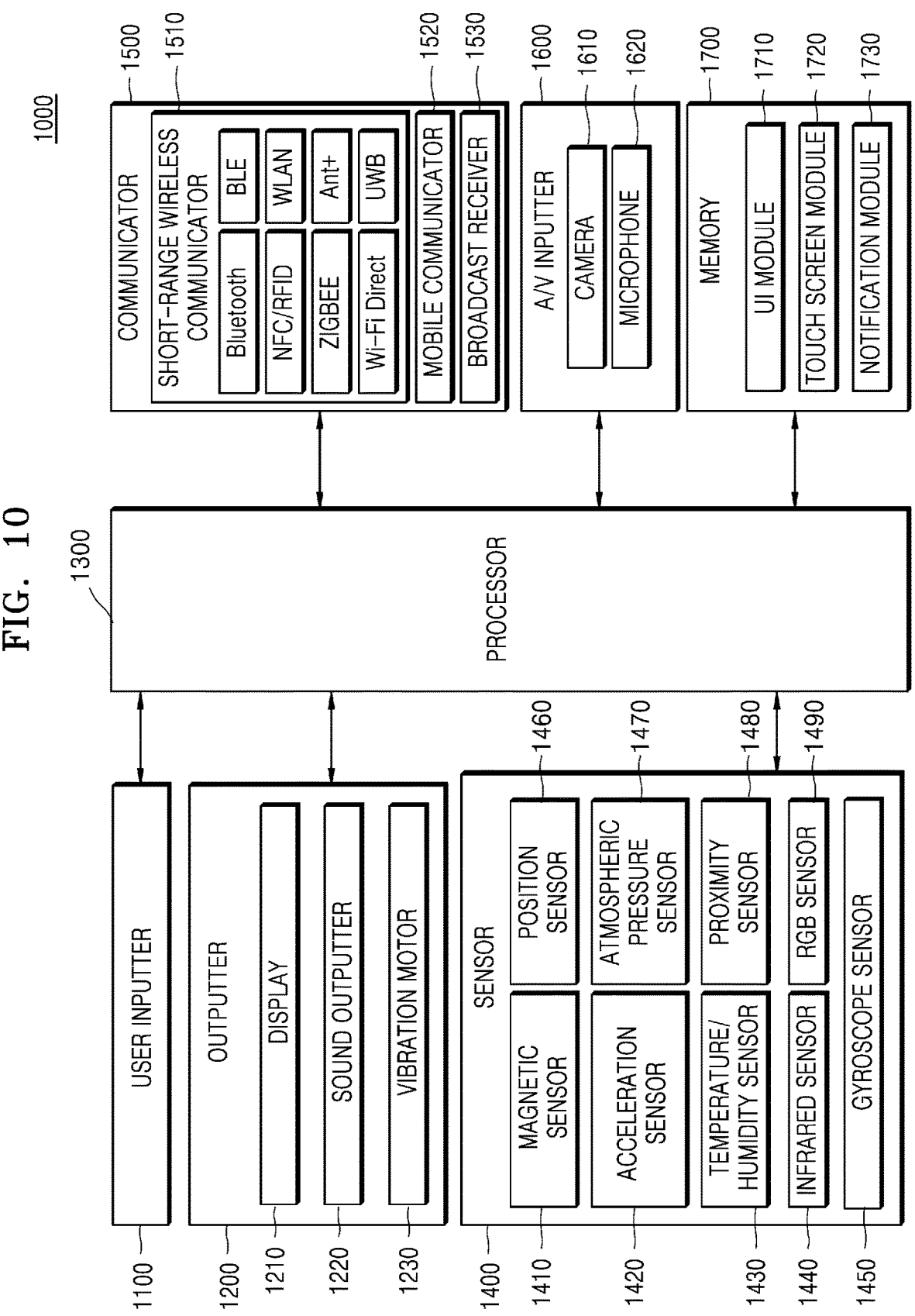
FIG. 10 is a block diagram illustrating an example configuration of an example electronic apparatus, according to an embodiment of the disclosure.

FIG. 10 is a block diagram illustrating an example configuration of the electronic apparatus 1000, according to an embodiment of the disclosure.

Referring to FIG. 9, the electronic apparatus 1000 may include a memory 1700, a processor (e.g., including processing circuitry) 1300, and a communicator (e.g., including communication circuitry) 1500. However, the components shown in FIG. 9 are not all essential components of the electronic apparatus 1000. The electronic apparatus 1000 may be embodied with more components than the components shown in FIG. 9 or may be embodied with fewer components than the components shown in FIG. 9.

For example, as shown in FIG. 10, the electronic apparatus 1000 according to an embodiment of the disclosure may further include a user inputter (e.g., including input circuitry) 1100, an outputter (e.g., including output circuitry) 1200, a sensor 1400, and an audio/video (AN) inputter (e.g., including AN input circuitry) 1600 in addition to the memory 1700, the processor 1300, and the communicator 1500.

The user inputter 1100 may include various input circuitry and may be a unit into which data for a user to control the electronic apparatus 1000 is input. For example, the user inputter 1100 may include various input circuitry including, for example, and without limitation, a key pad, a dome switch, a touch pad (contact capacitance type, pressure resistive type, IR detection type, surface ultrasonic wave conduction type, integral tension measuring type, piezoeffect type, or the like), a jog wheel, a jog switch, or the like, but is not limited thereto.

According to an embodiment of the disclosure, the user inputter 1100 may receive an input of the user requesting a certain operation (for example, item recommendation, object recognition, or voice recognition) that is performable according to a local model. Also, the user inputter 1100 may receive an input of the user, which includes feedback information regarding an operation performed via the local model of the electronic apparatus 1000.

The outputter 1200 may include various output circuitry and output an audio signal, a video signal, or a vibration signal, and the outputter 1200 may include various circuitry including, for example, and without limitation, a display 1210, a sound outputter (e.g., including sound output circuitry) 1220, and a vibration motor 1230. The outputter 1200 according to an embodiment of the disclosure may output a result of the operation performed via the local model.

The display 1210 displays information processed by the electronic apparatus 1000. According to an embodiment of the disclosure, the display 1210 may display the result of the operation performed via the local model, according to an input of the user.

When the display 1210 and a touch pad are configured as a touch screen by forming a layer structure, the display 1210 may also be used as an input device as well as an output device. The display 1210 may include, for example, and without limitation, at least one of a liquid crystal display, a thin film transistor-liquid crystal display, an organic light-emitting diode, a flexible display, a three-dimensional (3D) display, an electrophoretic display, or the like. The electronic apparatus 1000 may include two or more displays 1210, according to an implementation of the electronic apparatus 1000.

The sound outputter 1220 may include various sound output circuitry and outputs audio data received from the communicator 1500 or stored in the memory 1700. The sound outputter 1220 according to an embodiment of the disclosure may output audio data indicating the result of the operation performed via the local model.

The vibration motor 1230 may output a vibration signal. The vibration motor 1230 may output a vibration signal when a touch is input on the touch screen. The vibration motor 1230 according to an embodiment of the disclosure may output a vibration signal indicating the result of the operation performed via the local model.

The processor 1300 may include various processing circuitry and controls an overall operation of the electronic apparatus 1000. For example, the processor 1300 may execute programs stored in the memory 1700 to control the user inputter 1100, the outputter 1200, the sensor 1400, the communicator 1500, and the AN inputter 1600, in overall. The electronic apparatus 1000 may include at least one processor 1300.

The processor 1300 may be configured to process commands of a computer program by performing a basic calculation, a logic, and input or output arithmetic operation. The command may be provided from the memory 1700 to the processor 1300 or may be provided to the processor 1300 after being received via the communicator 1500. For example, the processor 1300 may be configured to execute the command according to a program code stored in a recording apparatus, such as a memory.

The at least one processor 1300 according to an embodiment of the disclosure may detect that information about a context of the electronic apparatus 1000 used to refine the local model is changed. The information about the context may include, for example, context information, such as information about a state of the electronic apparatus 1000, information about the user of the electronic apparatus 1000, and information about a surrounding environment of the electronic apparatus 1000.

The at least one processor 1300 may generate a gradient for refining the local model, based on the changed context information. The at least one processor 1300 according to an embodiment of the disclosure may refine the local model using the gradient.

The at least one processor 1300 according to an embodiment of the disclosure may refine the local model of the electronic apparatus 1000 again, based on information about a global model received when the gradient is transmitted to a server. The information about the global model may be a gradient of the global model, which is generated based on the gradient transmitted from the electronic apparatus 1000. According to an embodiment of the disclosure, the gradient of the global model is generated based on the gradient transmitted from the electronic apparatus 1000, and the global model may be refined based on the gradient of the global model.

The sensor 1400 may detect a state of the electronic apparatus 1000 and/or a state of the surrounding environment of the electronic apparatus 1000, and transmit detected information to the processor 1300.

The context information used to refine the local model may be obtained based on various types of information detected by the sensor 1400 according to an embodiment of the disclosure. For example, information about the user or surrounding environment among the context information may be obtained based on various types of sensing information related to the user or surrounding environment detected by the sensor 1400.

The sensor 1400 may include, for example, and without limitation, at least one of a magnetic sensor 1410, an acceleration sensor 1420, a temperature/humidity sensor 1430, an infrared sensor 1440, a gyroscope sensor 1450, a position sensor 1460 (for example, a global positioning system), an atmospheric pressure sensor 1470, a proximity sensor 1480, and/or an RGB sensor 1490 (illuminance sensor), but is not limited thereto.

The communicator 1500 may include various communication circuitry included in one or more components enabling the electronic apparatus 1000 to communicate with the server 2000 or an external apparatus. For example, the communicator 1500 may include, for example, and without limitation, a short-range wireless communicator 1510, a mobile communicator 1520, and a broadcast receiver 1530.

The short-range wireless communicator 1510 may include a Bluetooth communicator, a Bluetooth low energy (BLE) communicator, a near field communicator/radio frequency identification communicator (NFC/RFID), a wireless local area network (WLAN) (Wi-Fi) communicator, a Zigbee communicator, an infrared data association (IrDA) communicator (not shown), a Wi-Fi direct (WFD) communicator, an ultra wideband (UWB) communicator, and/or an Ant+ communicator, but is not limited thereto.

The mobile communicator 1520 may include various mobile communication circuitry and transmit or receive a wireless signal to or from at least one of a base station, an external terminal, or a server, on a mobile communication network. Here, the wireless signal may include various types of data according to exchange of a voice call signal, an image call signal, or a text/multimedia message.

The broadcast receiver 1530 may include various receiver circuitry and receive a broadcast signal and/or information related to a broadcast from an external source through a broadcast channel. The broadcast channel may include a satellite channel or a terrestrial channel. According to an implementation example, the electronic apparatus 1000 may not include the broadcast receiver 1530.

The communicator 1500 according to an embodiment of the disclosure may transmit the gradient generated by the electronic apparatus 1000 to the server 2000, and receive the information about the global model refined based on the transmitted gradient from the server 2000.

The AN inputter 1600 may include various AN input circuitry and may include a unit into which an audio signal or a video signal is input, and may include, for example, a camera 1610 and a microphone 1620. The camera 1610 may obtain a still image or an image frame of a moving image via an image sensor, in a video call mode or a photographing mode. An image captured through the image sensor may be processed via the processor 1300 or a separate image processor (not shown). The microphone 1620 may receive an external sound signal and process the external sound signal into electric voice data.

The electronic apparatus 1000 according to an embodiment of the disclosure may obtain the context information, based on the audio signal or the video signal received via the AN inputter 1600. For example, the information about the user or surrounding environment among the context information may be obtained based on the audio signal or video signal about the user or surrounding environment, which is obtained via the AN inputter 1600.

The memory 1700 may store a program for processes and controls of the processor 1300, and store data input to or output from the electronic apparatus 1000.

The memory 1700 according to an embodiment of the disclosure may store at least one instruction and the at least one processor 1300 of the electronic apparatus 1000 may perform an operation according to an embodiment of the disclosure by executing the at least one instruction stored in the memory 1700.

The memory 1700 according to an embodiment of the disclosure may store at least one local model used to perform at least one operation and the context information of the electronic apparatus 1000, which is used to refine the local model.

The memory 1700 may include a storage medium of at least one type from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk.

Programs stored in the memory 1700 may be classified into a plurality of modules based on functions, and for example, and without limitation, may be classified into a user interface (UI) module 1710, a touch screen module 1720, and a notification module 1730.

The UI module 1710 may provide a specialized UI or graphics user interface (GUI), which interoperates with the electronic apparatus 1000 for each application. The touch screen module 1720 may detect a touch gesture of the user on a touch screen and transmit information about the touch gesture to the processor 1300. The touch screen module 1720 according to an embodiment of the disclosure may recognize and analyze a touch code. The touch screen module 1720 may be configured as separate hardware including a controller.

Various sensors may be provided inside or near the touch screen to detect a touch or proximity touch on the touch screen. An example of a sensor for detecting the touch on the touch screen includes a tactile sensor. The tactile sensor may include a sensor for detecting a contact of a specific object to a same or more extent that a person is capable of feeling. The tactile sensor may detect various types of information, such as roughness of a contact surface, stiffness of a contact object, and a temperature of a contact point.

The touch gesture of the user may include, for example, and without limitation, tapping, touching and holding, double tapping, dragging, panning, flicking, dragging and dropping, swiping, or the like.

The notification module 1730 may generate a signal for notifying event occurrence of the electronic apparatus 1000.

Figure 11:
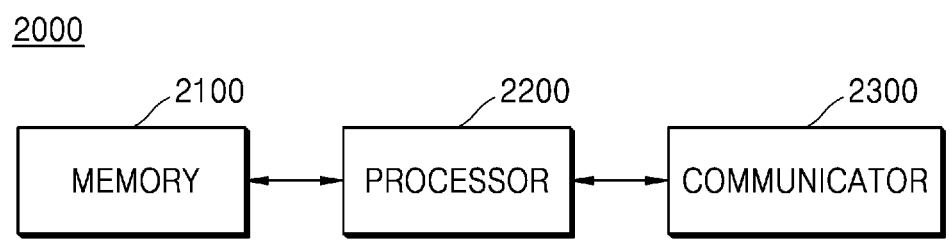
FIG. 11 is a block diagram illustrating an example configuration of an example server, according to an embodiment of the disclosure.

FIG. 11 is a block diagram illustrating an example configuration of the server 2000, according to an embodiment of the disclosure.

Referring to FIG. 11, the server 2000 according to an embodiment of the disclosure may include a memory 2100, a processor (e.g., including processing circuitry) 2200, and a communicator (e.g., including communication circuitry) 2300 like the components of the electronic apparatus 1000 shown in FIG. 9.

However, the components shown in FIG. 11 are not all essential components of the server 2000. The server 2000 may be embodied with more components than the components shown in FIG. 11 or may be embodied with fewer components than the components shown in FIG. 11.

The processor 2200 may include various processing circuitry and controls an overall operation of the server 2000. For example, the processor 2200 may control the server 2000 in overall by executing programs stored in the memory 2100. The server 2000 may include at least one processor 2200.

The processor 2200 may be configured to process commands of a computer program by performing a basic calculation, a logic, and input or output arithmetic operation. The command may be provided from the memory 2100 to the processor 2200 or may be provided to the processor 2200 after being received via the communicator 2300. For example, the processor 2200 may be configured to execute the command according to a program code stored in a recording apparatus, such as a memory.

The at least one processor 2200 according to an embodiment of the disclosure may refine a global model based on a gradient received from the electronic apparatus 1000. The at least one processor 2200 may generate and transmit, to the electronic apparatus 1000, information about the refined global model.

The at least one processor 2200 according to an embodiment of the disclosure may refine the global model based on a gradient not only received from the electronic apparatus 1000, but also received from a plurality of external apparatuses. Thus, the global model according to an embodiment of the disclosure may be refined based not only on the gradient of the electronic apparatus 1000, but also the gradient of the plurality of external apparatuses transmitted to the server 2000.

The communicator 2300 may include various communication circuitry included in one or more components enabling the server 2000 to communicate with the electronic apparatus 1000 or the external apparatus.

The communicator 2300 according to an embodiment of the disclosure may receive the gradient from the electronic apparatus 1000 and transmit the information about the global model refined based on the received gradient to the electronic apparatus 1000.

The memory 2100 may store a program for processes and controls of the processor 2200, and store data input to or output from the server 2000.

The memory 2100 according to an embodiment of the disclosure may store at least one instruction and the at least one processor 2200 of the server 2000 may perform an operation according to an embodiment of the disclosure by executing the at least one instruction stored in the memory 2100.

The memory 2100 of the server 2000 according to an embodiment of the disclosure may store the global model for performing a certain operation (for example, item recommendation, object recognition, or voice recognition).

Figure 12:
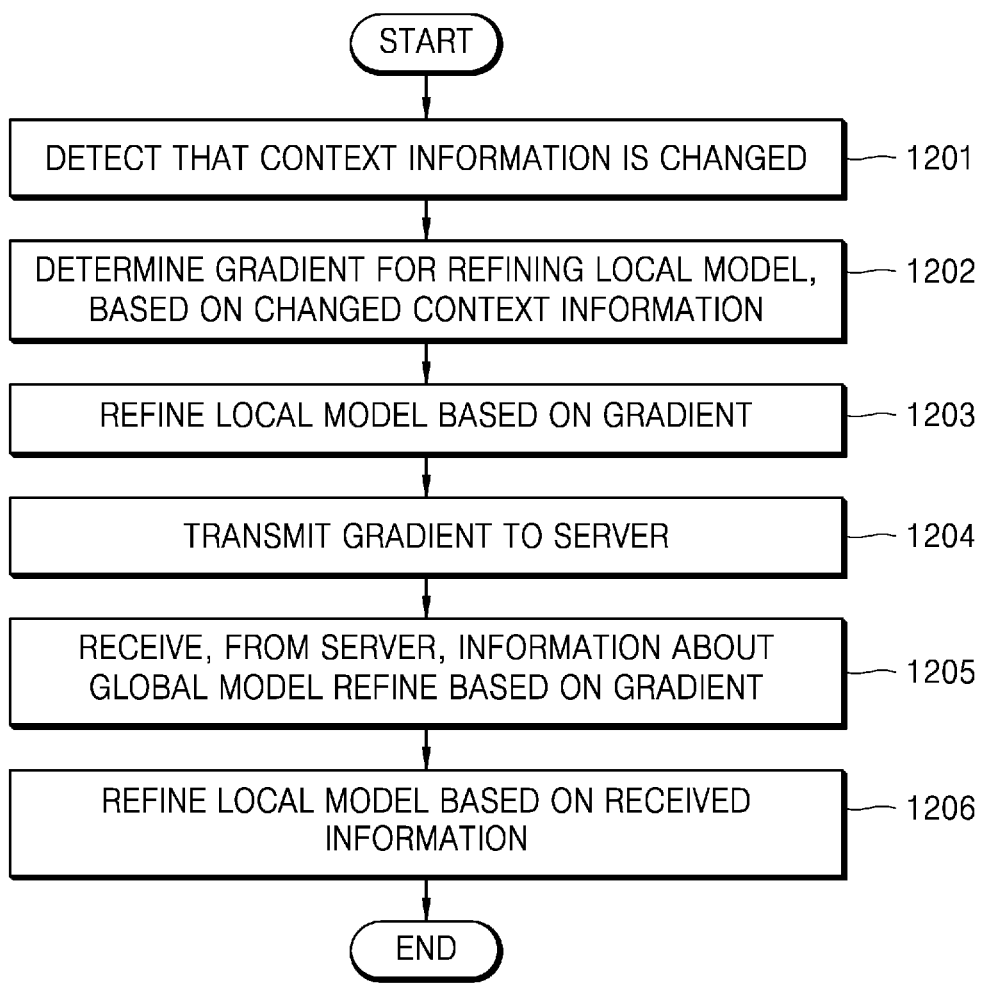
FIG. 12 is a flowchart illustrating an example method of refining a local model, according to an embodiment of the disclosure.

FIG. 12 is a flowchart illustrating an example method of refining a local model, according to an embodiment of the disclosure.

Referring to FIG. 12, in operation 1201, the electronic apparatus 1000 may detect that context information of the electronic apparatus 1000, which is used to refine a local model, is changed. The context information of the electronic apparatus 1000 may be used to refine the local model included in the electronic apparatus 1000, and may be input to the local model to be used in performing an operation (for example, item recommendation, object recognition, or voice recognition) according to the local model.

For example, when a new item usable by the electronic apparatus 1000 is found, context information related to the usable item of the electronic apparatus 1000 may be changed. When the electronic apparatus 1000 is moved to a new place, context information related to the place of the electronic apparatus 1000 may be changed. When a new object appears in a surrounding environment of the electronic apparatus 1000 or a shape of an existing object is changed, context information related to the surrounding environment of the electronic apparatus 1000 may be changed. When a new utterer appears in the surrounding environment of the electronic apparatus 1000, context information about the utterer on which voice recognition may be performed by the electronic apparatus 1000 may be changed.

The context information may be changed based on feedback information of a user regarding a result of performing an operation according to the local model.

However, an embodiment of the disclosure is not limited thereto, and the context information may include various types of information about the context of the electronic apparatus 1000, which may be used to refine the local model or perform an operation according to the local model.

In operation 1202, the electronic apparatus 1000 may determine a gradient for refining the local model based on the changed context information. The gradient according to an embodiment of the disclosure may be obtained based on a loss function indicating a difference between prediction information outputtable to the local model and observation information indicating an answer to the prediction information, based on the changed context information. For example, the gradient may include information related to a point where the loss function is the lowest, for example, slope information of the loss function at the point.

In operation 1203, the electronic apparatus 1000 may refine the local model based on the gradient.

In operation 1204, the electronic apparatus 1000 may transmit the gradient to the server 2000.

According to an embodiment of the disclosure, the electronic apparatus 1000 may transmit the gradient to the server 2000 instead of state information of the electronic apparatus 1000, which may include sensitive personal information of the user. Thus, according to an embodiment of the disclosure, the risk of the user's sensitive personal information leaking during transmission may be mitigated.

According to an embodiment of the disclosure, at least one of an operation of adding noise to the gradient or an operation of performing encryption on the gradient may be performed such that the gradient is protected during transmission. For example, a noise value that is arbitrarily generated may be added to at least one value indicating data modified by a refined AI model, which is included in the gradient. The noise value may be negligible compared to the at least one value. Thus, the electronic apparatus 1000 or the server 2000 may refine the local model or a global model according to an embodiment of the disclosure without having to identify or remove the added noise even when the noise is added to the gradient.

Because a data value itself is changed when the noise is added to the data, even when the gradient is leaked, the data included in the leaked gradient may be prevented. Thus, according to an embodiment of the disclosure, the gradient may be protected from an external attack or prevented from being leaked because the gradient that is modified by adding the noise or is encrypted is transmitted instead of the gradient itself.

In operation 1205, the electronic apparatus 1000 may receive information about the global model by transmitting the gradient to the server 2000. The global model of the server 2000 may be refined based on the gradient transmitted by the electronic apparatus 1000 and the information about the refined global model may be transmitted to the electronic apparatus 1000. For example, the information about the refined global model may be a gradient of the refined global model.

The information about the global model received in operation 1205 may be the gradient of the global model including information configuring the global model. The electronic apparatus 1000 may obtain the gradient of the refined global model of the server 2000, based on the gradient of the finally refined global model, and refine the local model based on the obtained gradient of the global model, in operation 1206.

The gradient of the global model according to an embodiment of the disclosure may be obtained based on differences between weight values of the global model of the server 2000 in a fixed time interval. The fixed time interval may be set based on a time interval where communication between the electronic apparatus 1000 and the server 2000 is performed. For example, the fixed time interval may be set to be an interval between a most recent time point where the communication between the electronic apparatus 1000 and the server 2000 is performed and a time point before the most recent time point. However, an embodiment of the disclosure is not limited thereto, and the gradient of the global model may include various types of information used to refine the global model.

The electronic apparatus 1000 may perform an operation according to the local model refined based on the gradient of the global model, according to an embodiment of the disclosure.

Figure 13:
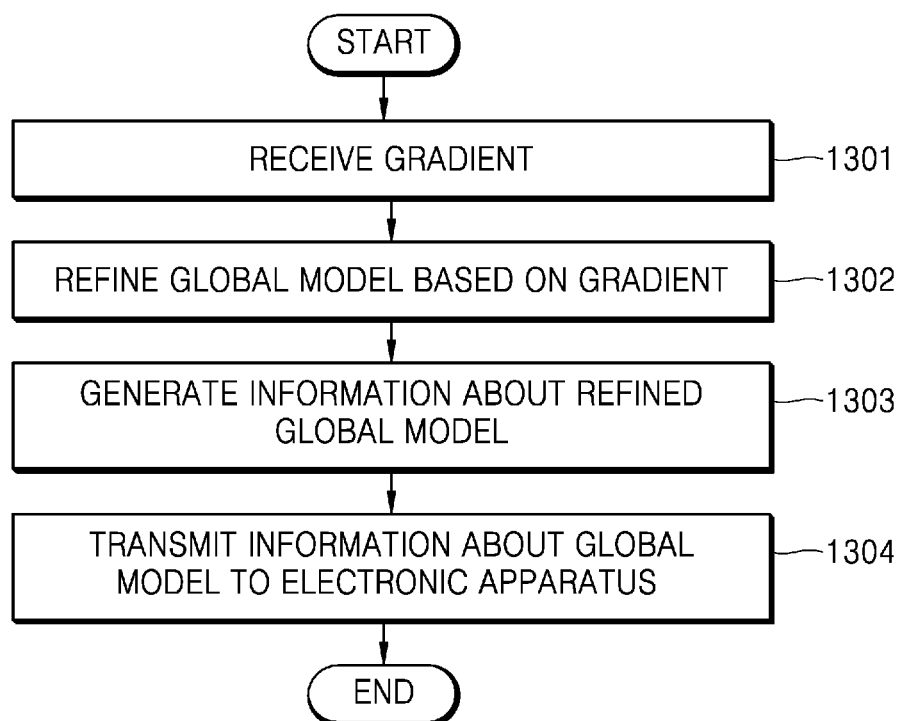
FIG. 13 is a flowchart illustrating an example method, performed by a server, of refining a global model, according to an embodiment of the disclosure.

FIG. 13 is a flowchart illustrating an example method, performed by a server, of refining a global model, according to an embodiment of the disclosure;

Referring to FIG. 13, in operation 1301, the server 2000 may receive a gradient from the electronic apparatus 1000.

According to an embodiment of the disclosure, the electronic apparatus 1000 may refine a local model based on the change in information about a context of the electronic apparatus 1000, which is used to refine the local model of the electronic apparatus 1000. The electronic apparatus 1000 may transmit the gradient including information configuring the refined local model to the server 2000.

Accordingly, the server 2000 may receive the gradient from the electronic apparatus 1000 when the local model is refined by the electronic apparatus 1000.

In operation 1302, the server 2000 may refine the global model based on the gradient. The global model according to an embodiment of the disclosure is a model for performing a certain operation (for example, item recommendation, object recognition, or voice recognition) and corresponding to the local model, and may be refined based on the gradient received from the electronic apparatus 1000.

For example, the server 2000 may refine the global model by refining various types of information configuring the global model, based on the gradient. For example, the server 2000 may refine the global model by refining a weight value and a bias value for each node configuring the global model.

The server 2000 may generate information about the refined global model, for example, a gradient, in operation 1303, and transmit the generated information about the global model to the electronic apparatus 1000, in operation 1304.

The electronic apparatus 1000 according to an embodiment of the disclosure may refine the local model of the electronic apparatus 1000, based on the information about the global model received from the server 2000. The electronic apparatus 1000 may perform a certain operation (for example, item recommendation, object recognition, or voice recognition) using the refined local model.

Hereinafter, a gradient of a current global model stored in the server 2000 before being refined according to an embodiment of the disclosure may be referred to as a first gradient, a gradient of a local model transmitted from the electronic apparatus 1000 to the server 2000 may be referred to as a second gradient, and a gradient for refining the current global model, which is obtainable based on the first gradient and the second gradient, will be referred to as a third gradient.

The server 2000 according to an embodiment of the disclosure may obtain the first gradient of the current global model and obtain the third gradient for refining the current global model, based on the first gradient and the second gradient received from the electronic apparatus 1000. The current global model may be refined based on the third gradient, and the local model of the electronic apparatus 1000 may be refined again when the third gradient is transmitted as information about the refined global model.

For example, at least one representative value for corresponding information between the first gradient of the refined global model and the second gradient of the refined local model may be obtained. The third gradient according to an embodiment of the disclosure may be configured in the obtained at least one representative value. The representative value may be, for example, an arithmetic average value or weighted average value between slope values included in the first gradient and the second gradient. Also, the representative value may be obtained based on a value obtained by simply adding slope values respectively included in the first gradient and the second gradient.

For example, the first gradient may include slope information of a loss function of the global model and the second gradient may include slope information of a loss function of the local model. Slope information according to an embodiment of the disclosure may include values obtained by partial differentiating a loss function using each prediction value included in prediction information as a variable. The slope information of the gradient may include a value corresponding to a point where a value of the loss function is the lowest.

In this example, a representative value for the slope information of the global model and the slope information of the local model may be obtained as a representative value of the third gradient. For example, the arithmetic average value (for example, $(a+b)/2$) or weighted average value (for example, $(a*a1+b*b1)/2$) of the first gradient (a) of the global model and the second gradient (b) of the local model may be obtained as the representative value of the third gradient.

According to an embodiment of the disclosure, the global model based on the second gradient received from the electronic apparatus 1000 may be refined when the global model is refined based on the third gradient including the at least one representative value.

When the representative value is the weighted average value between the values included in the first gradient and the second gradient, the weight value applied to each value may be determined to be a most suitable value for refining the global model. For example, the weight value may be determined to be the most suitable value for refining the global model, according to a result of performing machine learning to determine the weight value. As another example, the weight value of the weighted average value may be determined based on a gradient for a training result to be given a greater weight between a training result of the global model and a training result of the local model.

When the global model is refined based on the gradient, according to an embodiment of the disclosure, the server 2000 may obtain the third gradient used to refine the global model as the information about the refined global model.

The information about the refined global model, which is generated by the server 2000 according to an embodiment of the disclosure, may include information required to refine the local model of the electronic apparatus 1000. For example, the local model of the electronic apparatus 1000 may be refined based on the information (for example, the third gradient) about the refined global model, which is received from the server 2000.

The local model according to an embodiment of the disclosure may be refined according to the changed context information, and then refined based on the third gradient received from the server 2000 and the second gradient of the local model. For example, a fourth gradient for refining the local model again may be obtained based on the third gradient received from the server 2000 and the second gradient of the local model. A refining operation of the local model in response to the reception of the third gradient may be performed based on the fourth gradient.

For example, the at least one representative value for the corresponding information between the information included in the third gradient and the information included in the second gradient may be obtained. The fourth gradient according to an embodiment of the disclosure may be configured in the obtained at least one representative value. The representative value may be, for example, an arithmetic average value or weighted average value between values included in the third gradient and the second gradient.

For example, the third gradient may include information related to a loss function of the refined global model and the second gradient may include information related to a loss function of the local model. In this case, a representative value (for example, an arithmetic average value or weighted average value) for the first gradient of the refined global model and the second gradient of the local model may be obtained as a representative value of the fourth gradient.

According to an embodiment of the disclosure, the local model based on the third gradient received from the electronic apparatus 1000 may be refined based on the fourth gradient including the at least one representative value. For example, the local model may be refined when the information related to the loss function of the local model is replaced based on the representative values included in the fourth gradient.

According to an embodiment, when the representative value is a weighted average value (for example, $(c*c1+d*d1)/2$) between values (for example, c and d) included in the third gradient and the second gradient, the weight values (for example, c1 and d1) respectively applied to the values may be determined as the most suitable value for refining the local model. For example, the weight value may be determined to be the most suitable value for refining the local model, according to a result of performing machine learning to determine the weight value.

According to an embodiment of the disclosure, the machine learning for determining the weight value may be performed so as to determine the weight value that enables the operation by the local model refined according to the weight value to be suitably performed without contradicting a state of the electronic apparatus 1000 or a surrounding context of the electronic apparatus 1000. For example, the weight value may be learned based on the information about the context of the electronic apparatus 1000. However, an embodiment of the disclosure is not limited thereto, and the weight value applied to each value may be determined to be a suitable value according to various methods.

Figure 14:
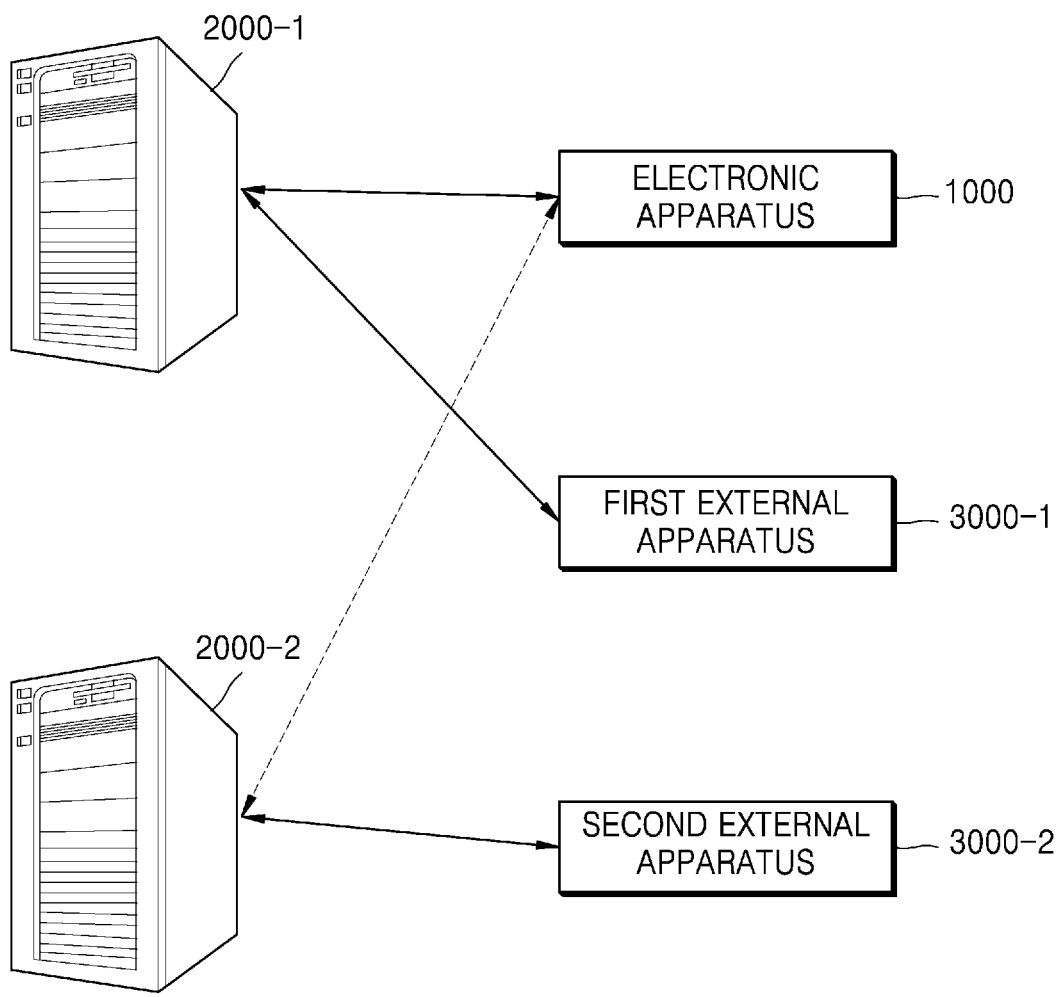
FIG. 14 is a diagram illustrating an example system for refining a local model and a global model, according to an embodiment of the disclosure.

According to an embodiment of the disclosure, the information about the refined global model is not limited to the third gradient and may include various types of information required to refine the local model, based on the recently refined global model FIG. 14 is a diagram illustrating an example system for refining a local model and a global model, according to an embodiment of the disclosure.

As shown in FIG. 14, the system according to an embodiment of the disclosure may include the electronic apparatus 1000, a first server 2000-1, a second server 2000-2, the first external apparatus 3000-1, and the second external apparatus 3000-2.

The electronic apparatus 1000, and the first server 2000-1 and the second server 2000-2 of FIG. 14 correspond to the electronic apparatus 1000 and the server 2000 of FIG. 1. The first external apparatus 3000-1 and the second external apparatus 3000-2 of FIG. 14 correspond to the first external apparatus 3000-1 and the second external apparatus 3000-2 of FIG. 2.

Like the electronic apparatus 1000, the first external apparatus 3000-1 and the second external apparatus 3000-2 according to an embodiment of the disclosure may provide various services using local models respectively included in the first external apparatus 3000-1 and the second external apparatus 3000-2.

The electronic apparatus 1000 according to an embodiment of the disclosure may identify the first server 2000-1 and the second server 2000-2, which may receive information about a global model, upon transmitting a gradient of a local model. The electronic apparatus 1000 may identify the first server 2000-1 and the second server 2000-2 by pre-receiving information about the first server 2000-1 and the second server 2000-2 from an external source. The electronic apparatus 1000 may determine a suitable server among the identified first server 2000-1 and second server 2000-2, based on the information about each server. The electronic apparatus 1000 may receive information about the global model refined based on the gradient by transmitting the gradient to the determined server.

For example, the electronic apparatus 1000 may determine a server that is physically close to the electronic apparatus 1000 as the server to which the gradient is to be transmitted among the identified first server 2000-1 and second server 2000-2.

The electronic apparatus 1000 may determine a server including the global model having the same or similar characteristics as the local model as the server to which the gradient is to be transmitted among the identified first server 2000-1 and second server 2000-2.

A global model of a server according to an embodiment of the disclosure may be suitably used to perform various operations, such as, for example, and without limitation, item recommendation, object recognition, voice recognition, or the like, under a specific condition, according to various characteristics or a location of the server. For example, a global model of a server located in the United Kingdom may be a model generated considering cultural characteristics of the United Kingdom, and the electronic apparatus 1000 located in the United Kingdom may be suitably used to perform item recommendation.

In the example shown in FIG. 14, the electronic apparatus 1000 may transmit the gradient to the first server 2000-1 upon determining that it is suitable to refine the local model via the global model of the first server 2000-1 among the first server 2000-1 and the second server 2000-2. Like the electronic apparatus 1000, the first external apparatus 3000-1 may transmit the gradient to the first server 2000-1 upon determining that it is suitable to refine the local model via the global model of the first server 2000-1.

On the other hand, the second external apparatus 3000-2 may transmit the gradient to the second server 2000-2 upon determining that it is suitable to refine the local model via the global model of the second server 2000-2.

Figure 15:
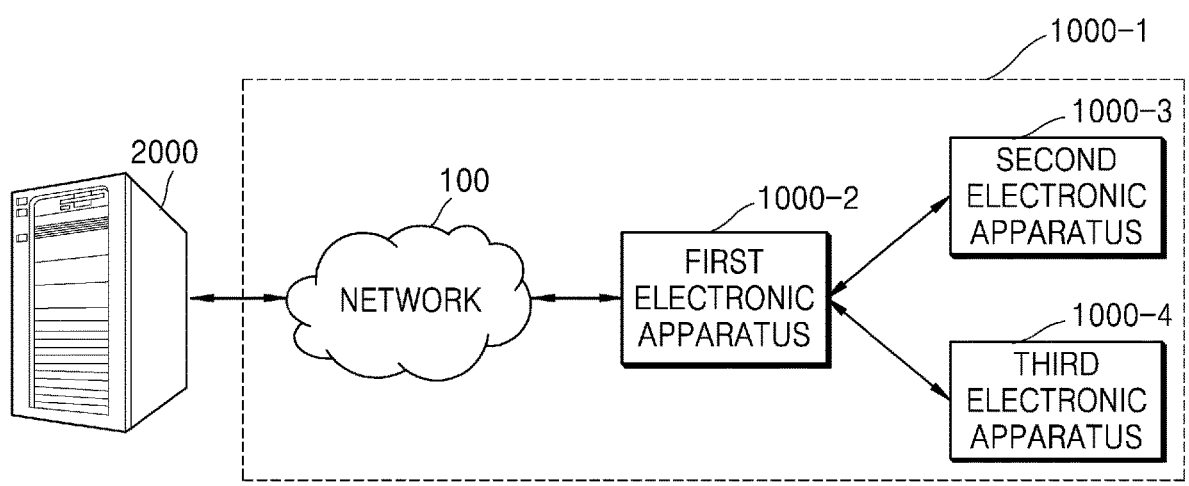
FIG. 15 is a diagram illustrating an example system for refining a local model and a global model via a relay apparatus, according to an embodiment of the disclosure.

FIG. 15 is a diagram illustrating an example system for refining a local model and a global model via a relay apparatus, according to an embodiment of the disclosure.

As shown in FIG. 15, the system according to an embodiment of the disclosure may include a first electronic apparatus 1000-2, a second electronic apparatus 1000-3, a third electronic apparatus 1000-4, and the server 2000.

The server 2000 of FIG. 15 may correspond to the electronic apparatus 1000 of FIG. 1. The first electronic apparatus 1000-2, the second electronic apparatus 1000-3, and the third electronic apparatus 1000-4 according to an embodiment of the disclosure may provide various services (for example, item recommendation, object recognition, and voice recognition) to a user using a local model provided in each of the first electronic apparatus 1000-2, the second electronic apparatus 1000-3, and the third electronic apparatus 1000-4.

Referring to FIG. 15, the first electronic apparatus 1000-2, the second electronic apparatus 1000-3, and the third electronic apparatus 1000-4 may be classified as a group 1000-1. For example, the first electronic apparatus 1000-2, the second electronic apparatus 1000-3, and the third electronic apparatus 1000-4 may be classified as one group 1000-1 by being determined as apparatuses used by the same user in a house of the user. The first electronic apparatus 1000-2, the second electronic apparatus 1000-3, and the third electronic apparatus 1000-4 may be classified as one group 1000-1 based, for example, on various criteria, such as whether they are located geographically close to each other and whether they are used by the same account. The second electronic apparatus 1000-3 and the third electronic apparatus 1000-4 according to an embodiment of the disclosure may determine a relay apparatus through which a gradient of the local model of each of the second electronic apparatus 1000-3 and the third electronic apparatus 1000-4 is to be transmitted to the server 2000, among apparatuses in the group 1000-1 to which each apparatus belongs. The relay apparatus according to an embodiment of the disclosure may transmit, to the server 2000, the gradient of the local model refined according to the change in context information, instead of the second electronic apparatus 1000-3 and the third electronic apparatus 1000-4. Also, the relay apparatus may receive a gradient of a global model from the server 2000 upon transmitting the gradient of the refined local model, and transmit the received gradient of the global model to the second electronic apparatus 1000-3 and the third electronic apparatus 1000-4.

According to an embodiment of the disclosure, the second electronic apparatus 1000-3 and the third electronic apparatus 1000-4 may determine the first electronic apparatus 1000-2 as the relay apparatus among apparatuses included in the group 1000-1.

The first electronic apparatus 1000-2 determined as the relay apparatus according to an embodiment of the disclosure may be an apparatus with a better performance or network environment than the second electronic apparatus 1000-3 and the third electronic apparatus 1000-4. For example, the first electronic apparatus 1000-2 may be a smart phone with a better performance than the second and third electronic apparatuses 1000-3 and 1000-4. The second and third electronic apparatuses 1000-3 and 1000-4 may, for example, and without limitation, be a home appliance (for example, a robot cleaner, a refrigerator, or a smart television (TV)), or the like, with a lower performance than a smart phone.

Thus, information about the refined global model may be obtained faster when the gradient generated by each apparatus is transmitted to the server 2000 through the first electronic apparatus 1000-2 than when the gradients are transmitted directly to the server 2000 from the second electronic apparatus 1000-3 and the third electronic apparatus 1000-4.

The first electronic apparatus 1000-2 according to an embodiment of the disclosure may directly process the gradients received from the second electronic apparatus 1000-3 and the third electronic apparatus 1000-4 via, for example, an edge computing method. For example, the first electronic apparatus 1000-2 may refine the local model of the first electronic apparatus 1000-2, based on the gradient received from the second electronic apparatus 1000-3 or the third electronic apparatus 1000-4, and transmit a gradient of the refined local model to the second electronic apparatus 1000-3 or the third electronic apparatus 1000-4. The first electronic apparatus 1000-2 may transmit the gradient of the refined local model to the server 2000 and receive the gradient of the global model from the server 2000. The first electronic apparatus 1000-2 may refine the local model again using the received gradient of the global model.

The first electronic apparatus 1000-2 according to an embodiment of the disclosure may transmit, to the server 2000, at least one of the gradients received from the second electronic apparatus 1000-3 and the third electronic apparatus 1000-4 or the gradient generated based on the local model of the first electronic apparatus 1000-2.

For example, when a behavior pattern of the user is changed, it is highly likely that operation patterns of the first electronic apparatus 1000-2, the second electronic apparatus 1000-3, and the third electronic apparatus 1000-4 may change. Thus, when the local model is refined in the first electronic apparatus 1000-2 in response to the change in information about the behavior pattern of the user among context information according to an embodiment of the disclosure, the local models of the second electronic apparatus 1000-3 and the third electronic apparatus 1000-4 may be refined and the gradient may be generated by each apparatus.

According to an embodiment of the disclosure, upon receiving the gradient from at least one of the second electronic apparatus 1000-3 or the third electronic apparatus 1000-4 within a pre-set time after the gradient is generated based on the local model of the first electronic apparatus 1000-2, the first electronic apparatus 1000-2 may transmit the received gradient together with the gradient of the first electronic apparatus 1000-2 to the server 2000.

The server 2000 according to an embodiment of the disclosure may refine the global model based on the at least one gradient received from the first electronic apparatus 1000-2. The server 2000 according to an embodiment of the disclosure may transmit information about the refined global model to the first electronic apparatus 1000-2.

The first electronic apparatus 1000-2 according to an embodiment of the disclosure may transmit the information about the global model received from the server 2000 to the second electronic apparatus 1000-3 and the third electronic apparatus 1000-4. Each of the first electronic apparatus 1000-2, the second electronic apparatus 1000-3, and the third electronic apparatus 1000-4 may refine the local model stored therein, based on the information about the global model received from the server 2000.

Figure 16:
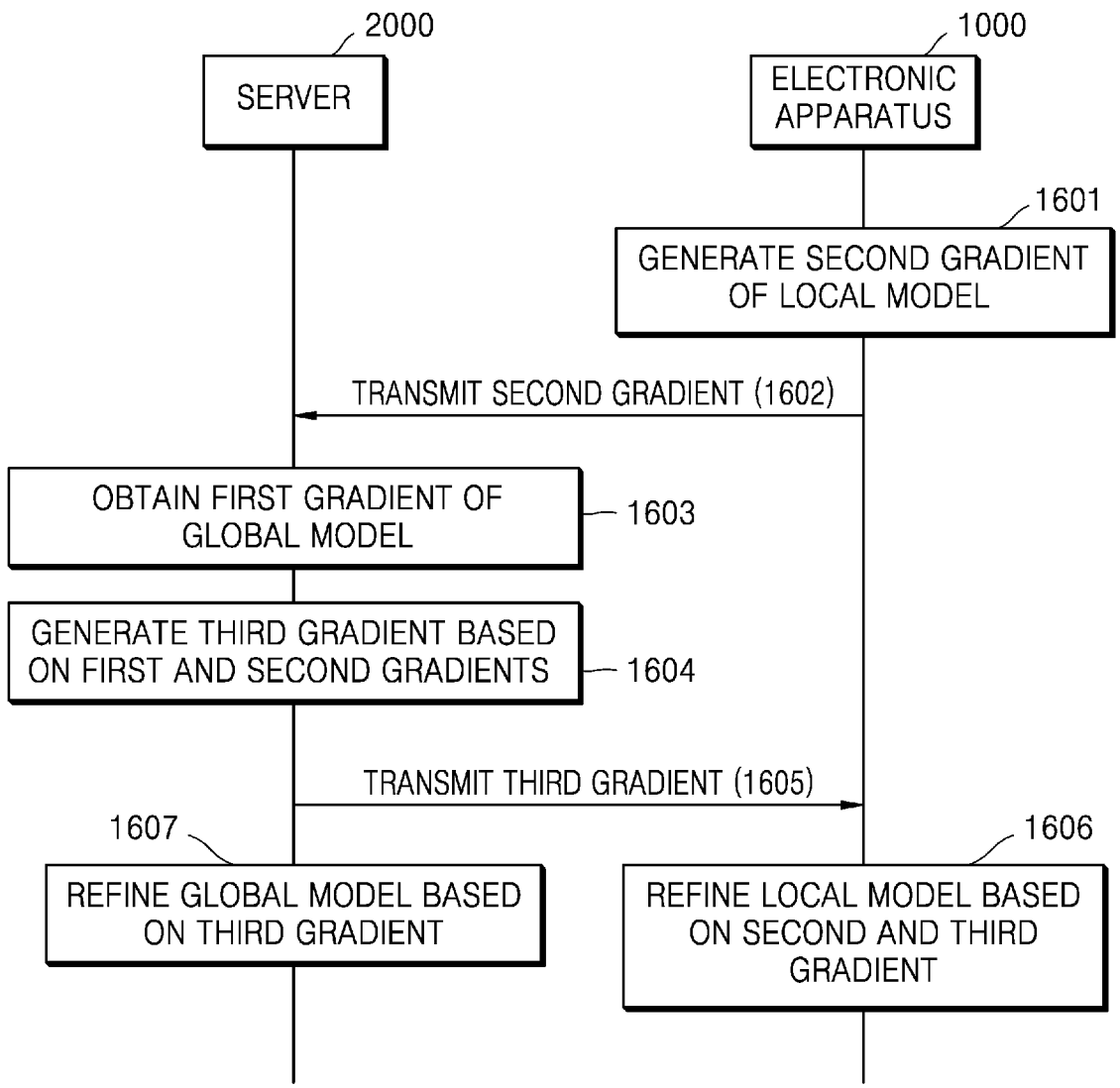
FIG. 16 is a signal flow diagram illustrating an example method of refining a global model and a local model according to a gradient, according to an embodiment of the disclosure.

FIG. 16 is a signal flow diagram illustrating an example method of refining a global model and a local model according to a gradient, according to an embodiment of the disclosure.

Referring to FIG. 16, the global model and the local model may be refined based on gradients of the global model and the local model.

Hereinafter, as described with reference to FIG. 1, a gradient of a current global model stored in the server 2000 may be referred to as a first gradient, a gradient of a local model transmitted from the electronic apparatus 1000 to the server 2000 may be referred to as a second gradient, and a gradient for refining the current global model, which is obtainable based on the first gradient and the second gradient, may be referred to as a third gradient.

According to an embodiment of the disclosure, the electronic apparatus 1000 may refine the local model upon detecting a change in context information of the electronic apparatus 1000. When the local model is refined based on the changed context information, the electronic apparatus 1000 may generate the second gradient of the refined local model in operation 1601.

The second gradient according to an embodiment of the disclosure may include information used to refine the local model, and may include, for example, a weight value applicable to each node and information obtained in relation to a loss function (for example, a slope value relate to a point where a value of the loss function is the lowest) to derive a bias value.

In operation 1602, the electronic apparatus 1000 may transmit the second gradient of the refined local model to the server 2000. The server 2000 according to an embodiment of the disclosure may refine the global model based on the second gradient received from the electronic apparatus 1000.

In operation 1603, the server 2000 may obtain the first gradient of the global model stored in the current server 2000 before refining the global model. In operation 1604, the server 2000 may generate the third gradient based on the first gradient and the second gradient. The third gradient according to an embodiment of the disclosure may include at least one representative value for corresponding information between information related to a loss function included in the first gradient and information related to a loss function included in the second gradient. The representative value according to an embodiment of the disclosure may be obtained based on an arithmetic average value, a weighted average value, or a simple addition value between values included in each gradient.

In operation 1605, the server 2000 may transmit the third gradient to the electronic apparatus 1000. In operation 1607, the server 2000 may refine the global model based on the third gradient. For example, the global model may be refined when the bias value and the weight value applicable to each node configuring the global model are modified based on the information related to the loss function included in the third gradient.

In operation 1606, the electronic apparatus 1000 may refine the local model based on the third gradient received from the server 2000. The refining of the local model in operation 1606 may be performed in the same manner as operations of generating the third gradient in operation 1604 and refining the global model Based on the third gradient in operation 1607.

For example, the local model may be refined when the bias value and the weight value applicable to each node configuring the local model are modified such that prediction information corresponding to at least one representative value for corresponding information between information included in the second gradient and information included in the third gradient is output by the local model.

According to an embodiment of the disclosure, the at least one representative value may be an arithmetic average value and a weighted average value between values included in the second gradient and the third gradient. Also, a weight value applied to each value in the weighted average value may be determined to be a value trained such that an operation according to the local model is suitable to a current context of the electronic apparatus 1000. For example, a weight value applied to a value included in the gradient of the local model among the weight values applied to information in the weighted average value may be determined based on context information of the electronic apparatus 1000.

Figure 17:
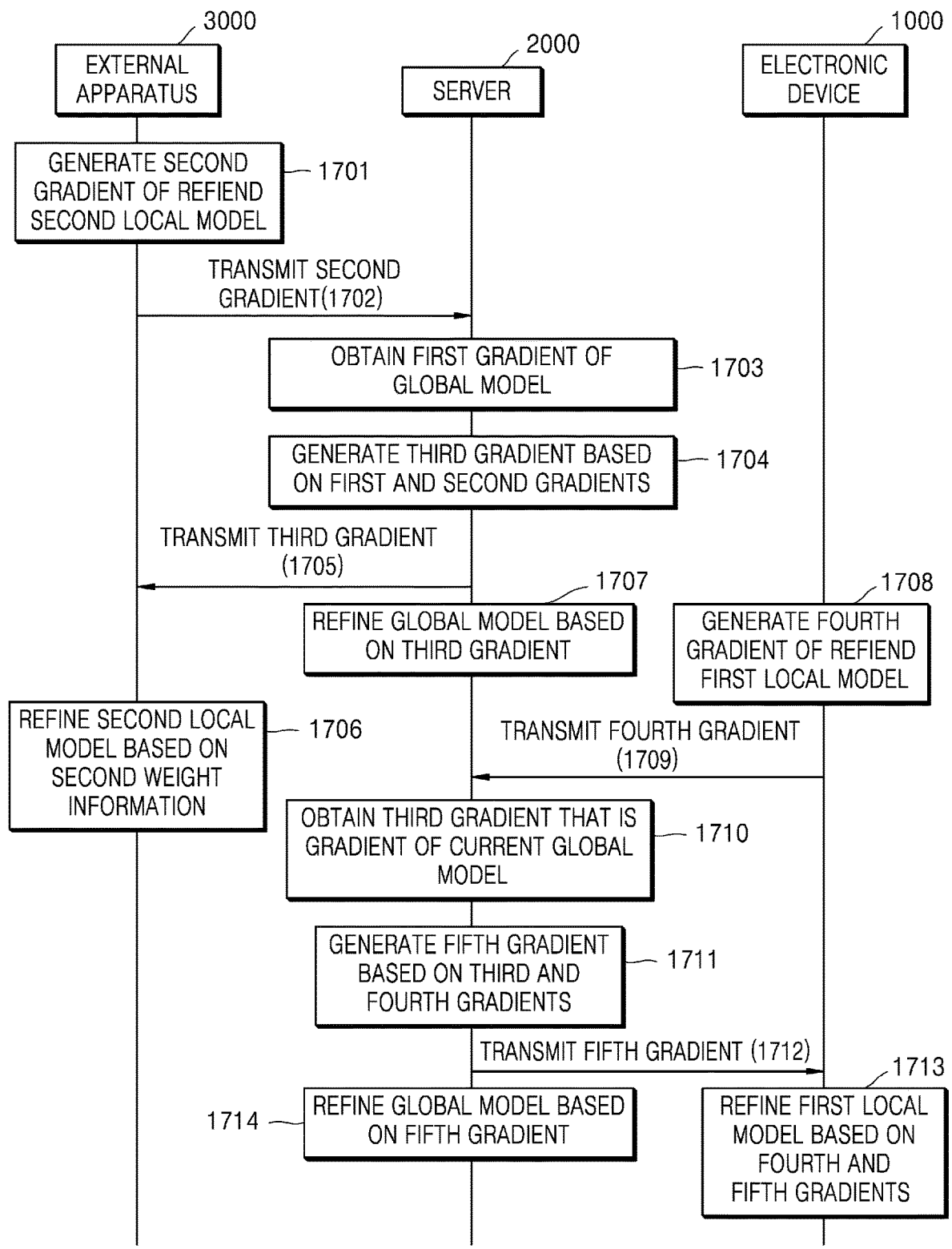
FIG. 17 is a signal flow diagram illustrating an example method of refining a global model, a first local model of an electronic apparatus, and a second local model of an external apparatus, according to a gradient, according to an embodiment of the disclosure.

FIG. 17 is a signal flow diagram illustrating an example method of refining a global model, a first local model of the electronic apparatus 1000, and a second local model of an external apparatus 3000, according to a gradient, according to an embodiment of the disclosure.

Referring to FIG. 17, the electronic apparatus 1000 may refine the first local model in response to a change in context information of the electronic apparatus 1000, and the external apparatus 3000 may refine the second local model in response to a change in context information of the external apparatus 3000.

The server 2000 of FIG. 17 may refine the global model, based on gradients of refined local models received from a plurality of apparatuses. The server 2000 may transmit a gradient of the refined global model to each apparatus that transmitted the gradient of the local model to the server 2000.

Hereinafter, as described with reference to FIGS. 1 and 16, a gradient of a current global model stored in the server 2000 may be referred to as a first gradient, a gradient of a local model transmitted from the external apparatus 3000 to the server 2000 may be referred to as a second gradient, and a gradient for refining the current global model, which is obtainable based on the first gradient and the second gradient, may be referred to as a third gradient.

The gradient of the local model transmitted from the electronic apparatus 1000 to the server 2000 may be referred to as a fourth gradient. When the gradient of the global model when the local model is refined is the third gradient, a gradient obtainable to refine a current global model, based on the third gradient and the fourth gradient, may be referred to as a fifth gradient.

According to an embodiment of the disclosure, as in the refining of the local model in FIG. 16, the external apparatus 3000 may refine the second local model of the external apparatus 3000 upon detecting a change in context information of the external apparatus 3000. When the second local model is refined based on the changed context information, the external apparatus 3000 may generate the second gradient of the refined second local model in operation 1701.

In operation 1702, the external apparatus 3000 may transmit the second gradient of the refined second local model to the server 2000. The server 2000 according to an embodiment of the disclosure may refine the global model based on the second gradient received from the external apparatus 3000.

In operation 1703, the server 2000 may obtain the first gradient of the global model stored in the current server 2000 before refining the global model. The first gradient may include information pre-generated when the global model is refined and already stored in the server 2000.

In operation 1704, the server 2000 may generate the third gradient based on the first gradient and the second gradient.

In operation 1705, the server 2000 may transmit the third gradient to the external apparatus 3000. In operation 1707, the server 2000 may refine the global model according to the third gradient.

In operation 1706, the external apparatus 3000 may refine the second local model based on the second gradient and the third gradient received from the server 2000. The refining of the second local model in operation 1706 may be performed in the same manner as operation of refining the global model according to the generated third gradient in operation 1704 and the first gradient.

In operation 1708, the electronic apparatus 1000 may refine the first local model of the electronic apparatus 1000 in the same manner as the refining of the second local model in operation 1701, upon detecting a change in context information of the electronic apparatus 1000. When the first local model is refined based on the changed context information, the electronic apparatus 1000 may generate the fourth gradient of the refined first local model in operation 1708.

In operation 1709, the electronic apparatus 1000 may transmit the fourth gradient of the refined first local model to the server 2000. The fourth gradient may be received from the server 2000 after the global model is refined according to the third gradient in operation 1707. The server 2000 according to an embodiment of the disclosure may refine the global model that is refined in operation 1707 again, based on the fourth gradient received from the electronic apparatus 1000.

Thus, the global model according to an embodiment of the disclosure may be refined based on a plurality of gradients of local models refined by a plurality of apparatuses.

In operation 1710, the server 2000 may obtain the third gradient of the current global model before refining the global model. In operation 1711, the server 2000 may generate the fifth gradient based on the third gradient and the fourth gradient. The fifth gradient according to an embodiment of the disclosure may include at least one representative value of information corresponding between the third gradient and the fourth gradient. The representative value according to an embodiment of the disclosure may be obtained based on an arithmetic average value, a weighted average value, or a simple addition value between values included in each gradient.

In operation 1712, the server 2000 may transmit the fifth gradient to the electronic apparatus 1000. In operation 1714, the server 2000 may refine the global model based on the fifth gradient.

In operation 1713, the electronic apparatus 1000 may refine the first local model based on the fourth gradient and the fifth gradient received from the server 2000. The refining of the first local model in operation 1713 may be performed in the same manner as the refining of the second local model in operation 1706.

Figure 18:
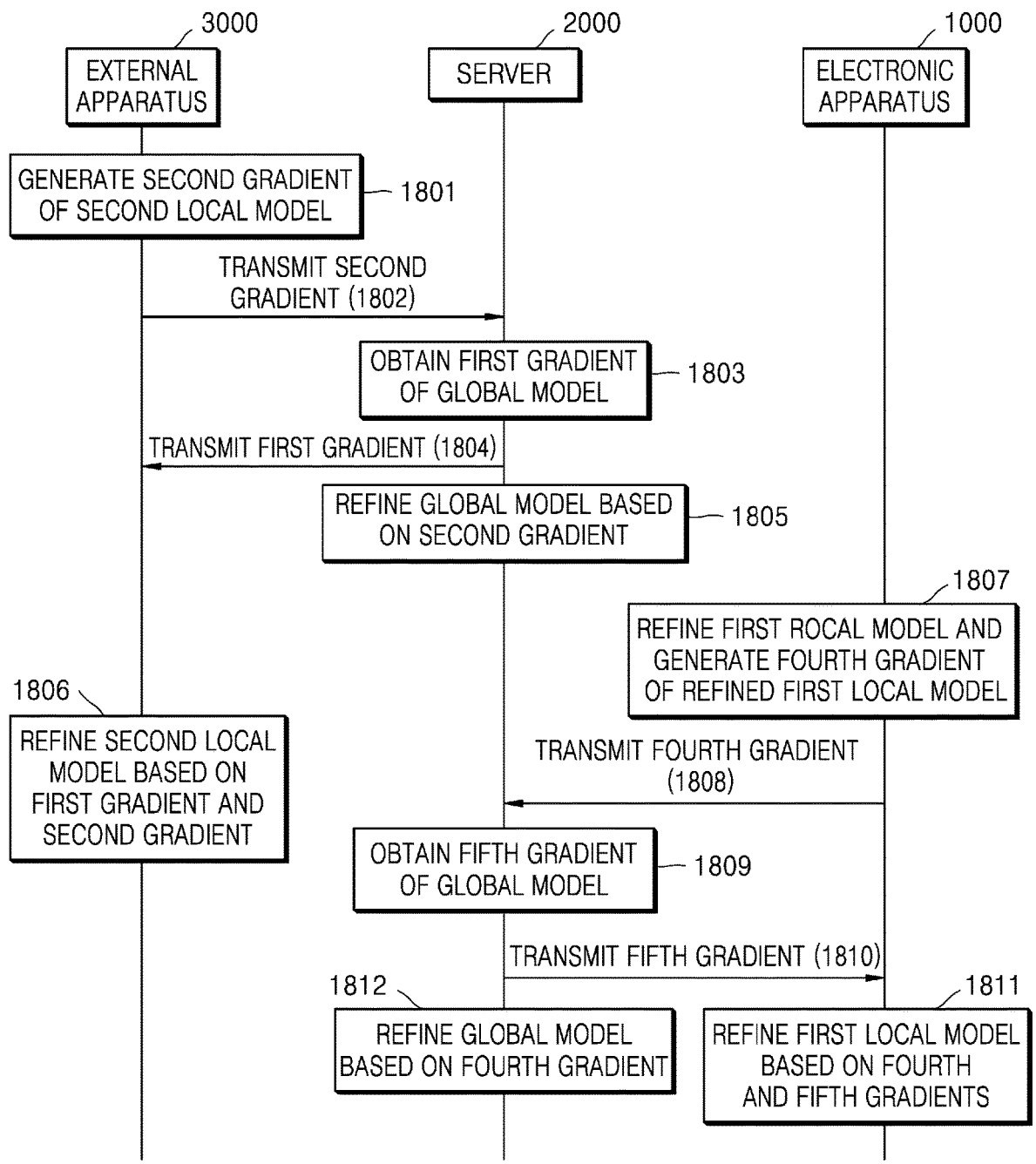
FIG. 18 is a signal flow diagram illustrating an example method of refining a global model, a first local model of an electronic apparatus, and a second local model of an external apparatus, according to a gradient, according to an embodiment of the disclosure.

FIG. 18 is a signal flow diagram illustrating an example method of refining a global model, a first local model of an electronic apparatus, and a second local model of an external apparatus according to a gradient, according to an embodiment of the disclosure.

Operations of FIG. 18 partially correspond to the operations of FIG. 17, but unlike the method of FIG. 17, the first local model, the second local model, and the global model may be refined in the example embodiment illustrated in FIG. 18.

According to an embodiment of the disclosure, the external apparatus 3000 may refine the second local model of the external apparatus 3000 upon detecting a change in context information of the external apparatus 3000 in a manner similar to the refining of the local model in FIGS. 16 and 17. When the second local model is refined based on the changed context information, the external apparatus 3000 may generate a second gradient of the refined second local model in operation 1801.

In operation 1802, the external apparatus 3000 may transmit the second gradient of the refined second local model to the server 2000. The server 2000 according to an embodiment of the disclosure may refine the global model based on the second gradient received from the external apparatus 3000.

In operation 1803, the server 2000 may obtain a first gradient of the global model stored in the current server 2000 before refining the global model.

For example, the first gradient of the global model may be obtained based on differences between weight values of the global model in a fixed time interval. The fixed time interval may be set to be an interval between a most recent time point where communication between the server 2000 and the electronic apparatus 1000 or other external apparatuses is performed to refine the local model or the global model, and a time point before the most recent time point.

In operation 1804, the server 2000 may transmit the first gradient obtained in operation 1803 to the external apparatus 3000.

Then, in operation 1805, the server 2000 may refine the global model based on the second gradient. For example, the server 2000 may generate a third gradient based on the first gradient and the second gradient, and refine the global model according to the third gradient. For example, the third gradient may include at least one representative value of information corresponding between the first gradient and the second gradient. However, an embodiment of the disclosure is not limited thereto and the server 2000 may refine the global model based on the second gradient according to various methods.

In operation 1806, the external apparatus 3000 may refine the second local model based on the second gradient and the first gradient received from the server 2000. The refining of the second local model in operation 1806 may be performed in the same or similar manner as the generating of the third gradient and refining the global model according to the generated third gradient and the first gradient in operation 1805.

According to an embodiment of the disclosure, the third gradient used to refine the global model or the second local model based on the first gradient and the second gradient may be generated based on a representative value suitable for refining the global model or the second local model. For example, when the representative value suitable for refining the global model may be a simple addition value, the global model may be refined based on the third gradient generated based on a value obtained by simply adding the information corresponding between the first gradient and the second gradient.

An embodiment of the disclosure is not limited thereto, and the global model and the second local model may be refined according to various methods, based on information obtained according to the various methods, based on the first gradient and the second gradient.

In operation 1807, the electronic apparatus 1000 may refine the first local model of the electronic apparatus 1000 upon detecting the change in the context information of the electronic apparatus 1000, like the refining of the second local model in operation 1801. When the first local model is refined based on the changed context information, the electronic apparatus 1000 may generate a fourth gradient of the refined first local model, in operation 1807.

In operation 1808, the electronic apparatus 1000 may transmit the fourth gradient of the refined first local model to the server 2000. The fourth gradient may be received by the server 2000 after the global model is refined in operation 1805. The server 2000 according to an embodiment of the disclosure may refine the global model refined in operation 1805 again based on the fourth gradient received from the electronic apparatus 1000.

Accordingly, the global model according to an embodiment of the disclosure may be refined based on a plurality of gradients of local models refined by a plurality of apparatuses.

In operation 1809, the server 2000 may obtain a fifth gradient of the current global model before refining the global model.

According to an embodiment of the disclosure, the fifth gradient of the global model at the current time point may be obtained in operation 1809, in consideration of a case where the global model may be refined due to various factors, after the global model is refined in operation 1805. For example, the fifth gradient may be obtained based on differences between weight values of the global model at a fixed time interval. The fixed time interval may be set to be an interval between a most recent time point where communication between the server 2000 and the external apparatus 1000 or other external apparatuses is performed to refine the local model or global model, and a time point before the most recent time point.

In operation 1810, the server 2000 may transmit the fifth gradient obtained in operation 1809 to the electronic apparatus 1000 such that the first local model of the electronic apparatus 1000 is refined according to the current global model.

In operation 1811, the electronic apparatus 1000 may refine the first local model based on the fourth gradient and the fifth gradient received from the server 2000. The refining of the first local model in operation 1811 may be performed in the same or similar manner as generating of a sixth gradient and refining the global model according to the generated sixth gradient in operation 1812 below.

In operation 1812, the server 2000 may refine the global model based on the fourth gradient. For example, the server 2000 may generate the sixth gradient based on the fourth gradient and the fifth gradient, and refine the global model according to the generated sixth gradient. The sixth gradient according to an embodiment of the disclosure may include at least one representative value of information corresponding between the fourth gradient and the fifth gradient. The representative value according to an embodiment of the disclosure may be obtained based on an arithmetic average value, a weighted average value, or a simple addition value between values included in each gradient. An embodiment of the disclosure is not limited thereto and the server 2000 may refine the global model according to various methods, based on the fourth gradient.

According to an embodiment of the disclosure, the sixth gradient used to refine the global model or the first local model based on the fourth gradient and the fifth gradient may be generated based on a representative value suitable for refining the global model or first local model, For example, when the representative value suitable for refining the global model is a simple addition value, the global model may be refined based on the sixth gradient generated based on a value obtained by simply adding information corresponding between the fourth gradient and the fifth gradient.

An embodiment of the disclosure is not limited thereto, and the global model and the first local model may be refined according to various methods, based on information obtained according to various methods, based on the fourth gradient and the fifth gradient.

According to an embodiment of the disclosure, a risk of personal information being leaked during transmission may be eliminated and/or reduced because a gradient of a local model refined based on context information is transmitted to a server instead of information about a context of an electronic apparatus, which may include sensitive information of a user.

According to an embodiment of the disclosure, a local model may be more quickly refined because a gradient with a smaller data size than information about a context is transmitted to a server instead of the information about the context, to refine an AI model of an electronic apparatus.

An embodiment of the disclosure may also be realized in a form of a recording medium including instructions executable by a computer, such as a program module executed by a computer. A non-transitory computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically includes a computer-readable instruction, a data structure, or a program module, and includes an arbitrary information transmission medium.

Furthermore, in the disclosure, the term "unit" may include a hardware component such as a processor or circuit and/or a software component that is executed by a hardware component such as a processor.

The above description of the disclosure is provided for illustration, and it will be understood by those of ordinary skill in the art that various changes in form and details may be readily made therein without departing from features and the scope of the disclosure including the following claims. Accordingly, the above example embodiments of the disclosure are examples only in all aspects and are not limited. For example, each component described as a single type may be implemented in a distributed manner, and similarly, components described as distributed may be implemented in a combined form.

The scope of the disclosure includes the appended claims and is not limited to the detailed description, and all changes or modifications within the scope of the appended claims and their equivalents will be understood as being included in the scope of the disclosure.

What is claimed is:

1. A method, performed by an electronic apparatus, of refining an artificial intelligence (AI) model, the method comprising:
    detecting information about a change of a context of the electronic apparatus;
    based on detecting information about the change of the context of the electronic apparatus, refining a local model stored in the electronic apparatus by optimizing a plurality of weight values included in a plurality of neural network layers included in the local model based on the information about the change of the context of the electronic apparatus and the context of the electronic apparatus including a state of the electronic apparatus and information about a surrounding environment of the electronic apparatus;
    based on the information about the change of the context of the electronic apparatus, determining a first gradient for refining the local model stored in the electronic apparatus;
    receiving a second gradient from another electronic apparatus used to refine a local model stored on the other electronic apparatus within a pre-set time after the first gradient is determined;
    transmitting the first gradient and the second gradient to a server comprising a global model;
    receiving, from the server, a third gradient of the global model refined based on the first gradient and the second gradient in response to transmitting the first gradient and the second gradient;
    refining the local model stored in the electronic apparatus based on the third gradient by modifying weight values or bias for nodes included in the local model stored in the electronic apparatus; and
    performing an operation based on a result output by the local model stored in the electronic apparatus and refined based on the third gradient.

2. The method of claim 1, wherein the determining of the first gradient comprises:
    obtaining prediction information outputtable by the local model and observation information indicating an answer to the prediction information based on the change of the context of the electronic apparatus;
    obtaining a loss function indicating a difference between the observation information and the prediction information; and
    determining the first gradient including information related to a point where a value of the loss function is lowest.

3. The method of claim 1, wherein the third gradient of the global model includes information related to a point where a value of a loss function for the global model used to refine the global model is lowest.

4. The method of claim 3, wherein the refining of the local model, based on the third gradient, comprises:
obtaining at least one representative value regarding corresponding information between information related to a loss function included in the third gradient and information related to a loss function included in the first gradient for the refined local model; and
refining the local model based on the at least one representative value.

5. The method of claim 4, wherein at least one value of the at least one representative value includes at least one of an arithmetic average value or weighted average value regarding the corresponding information.

6. The method of claim 5, wherein the weighted average value is obtained based on at least one weight value being applied to the corresponding information, and
a weight value applied to the information related to the loss function included in the third gradient for the refined local model, among the at least one weight value, is determined based on the information about the context of the electronic apparatus.

7. The method of claim 1, wherein the global model is refined based on at least one gradient for each local model for at least one external apparatus based on each local model being refined, and the global model is further refined based on a gradient of the electronic apparatus based on the gradient being received from the electronic apparatus.

8. The method of claim 1, wherein the first gradient is transmitted to the server based on being subjected to at least one operation among an operation of adding noise and an operation of performing encoding.

9. The method of claim 1, wherein the transmitting comprises:
identifying a relay apparatus for transmitting the first gradient of the local model from the electronic apparatus; and
transmitting the first gradient of the local model to the server via the relay apparatus,
wherein the relay apparatus is configured to: receive at least one gradient from at least one electronic apparatus, and transmit the received at least one gradient to the server.

10. The method of claim 1, further comprising:
receiving a gradient for a current global model from the server in response to presence of a difference between the gradient for the current global model and a gradient for the global model previously transmitted from the server to the electronic apparatus, the difference being equal to or greater than a reference value; and
refining the local model based on the received gradient.

11. The method of claim 1, wherein, based on detecting that the information about the context of the electronic apparatus is changed, refining the local model based on at least one of the electronic apparatus currently being in an idle state, a memory space of the electronic apparatus for refining the local model being sufficient, a battery of the electronic apparatus currently being charged, or a current time being midnight.

12. The method of claim 1, wherein the operation comprising one or more of an operation of recommending an item, an operation of recognizing an object around the electronic apparatus, or an operation of performing voice recognition on an audio signal collected by the electronic apparatus.

13. The method of claim 1, wherein the state of the electronic apparatus including two or more of information about an operation state of the electronic, information about a network connection state of the electronic apparatus, information about a state of an operating system or application installed in the electronic apparatus, information about a location of the electronic apparatus, information about a movement state of the electronic apparatus, and information about a hardware state included in the electronic apparatus.

14. The method of claim 1, wherein the information about the surrounding environment of the electronic apparatus including information about an object present around the electronic apparatus and information about illumination of the surrounding environment of the electronic apparatus.

15. A computer program product comprising a non-transitory computer-readable recording medium having recorded thereon a program for implementing the method of claim 1.

16. An electronic apparatus configured to refine an artificial intelligence (AI) model, the electronic apparatus comprising:
a memory storing a local model including a plurality of neural network layers;
at least one processor, individually and/or collectively configured to:
detect information about a change of a context of the electronic apparatus used to refine the local model, the context of the electronic apparatus including a state of the electronic apparatus and information about a surrounding environment of the electronic apparatus;
based on detecting information about the change of the context of the electronic apparatus, refining the local model by optimizing a plurality of weight values included in the plurality of neural network layers included in the local model based on the information about the change of the context of the electronic apparatus; and
based on the information about the change of the context of the electronic apparatus, determining a first gradient for refining the local model; and
a communicator, comprising communication circuitry, configured to: receive a second gradient from another electronic apparatus used to refine a local model stored on the other electronic apparatus within a pre-set time after the first gradient is determined, transmit the first gradient and the second gradient to a server, and receive, from the server, a third gradient of a global model refined based on the first gradient and the second gradient in response to transmitting the first gradient and the second gradient,
wherein the at least one processor is further configured, individually and/or collectively, to:
refine the local model stored in the electronic apparatus based on the third gradient by modifying weight values or bias for nodes included in the local model stored in the electronic apparatus; and
perform an operation based on a result output by the local model stored in the electronic apparatus and refined based on the third gradient.

17. The electronic apparatus of claim 16, wherein the at least one processor is further configured to:

obtain prediction information outputtable by the local model and observation information indicating an answer to the prediction information based on the change of the context of the electronic apparatus, obtain a loss function indicating a difference between the observation information and the prediction information, and determine the first gradient including information related to a point where a value of the loss function is lowest.

18. The electronic apparatus of claim 17, wherein the at least one processor is further configured to:
obtain at least one representative value regarding corresponding information between information related to a loss function included in the third gradient and information related to a loss function included in the first gradient for the refined local model; and
refine the local model based on the at least one representative value.

19. The electronic apparatus of claim 18, wherein at least one value of the at least one representative value includes a weighted average value regarding the corresponding information,
the weighted average value obtained based on at least one weight value being applied to the corresponding information, and
wherein a weight value applied to the information related to the loss function included in the third gradient for the refined local model, among the at least one weight value, is determined based on the information about the context of the electronic apparatus.

20. The electronic apparatus of claim 16, wherein the third gradient of the global model includes information related to a point where a value of a loss function for the global model used to refine the global model is lowest.

21. The electronic apparatus of claim 16, wherein the global model is refined based on at least one gradient for each local model for at least one external apparatus based on each local model being refined, and further refined based on a gradient of the electronic apparatus based on the gradient being received from the electronic apparatus.

22. The electronic apparatus of claim 16, wherein the at least one processor is further configured to: identify a relay apparatus configured to transmit the first gradient of the local model from the electronic apparatus, and control the communicator to transmit the first gradient of the local model to the server via the relay apparatus, and
wherein the relay apparatus is configured to: receive at least one gradient from at least one electronic apparatus, and transmit the received at least one gradient to the server.

23. The electronic apparatus of claim 16, wherein the at least one processor is further configured to: control the communicator to receive a gradient for a current global model from the server in response to a presence of a difference between the gradient for the current global model and the gradient for the global model previously transmitted from the server to the electronic apparatus, the difference being equal to or greater than a reference value, and refine the local model based on the received gradient.

* * * * *